United States Patent
Zhong et al.

(10) Patent No.: US 10,071,798 B2
(45) Date of Patent: Sep. 11, 2018

(54) HYPERSONIC LAMINAR FLOW CONTROL

(71) Applicant: THE REGENTS OF THE UNIVERSITY OF CALIFORNIA, Oakland, CA (US)

(72) Inventors: Xiaolin Zhong, Calabasas, CA (US); Kahei Danny Fong, Los Angeles, CA (US); Xiaowen Wang, Culver City, CA (US)

(73) Assignee: The Regents of the University of California, Oakland, CA (US)

( * ) Notice: Subject to any disclaimer, the term of this patent is extended or adjusted under 35 U.S.C. 154(b) by 178 days.

(21) Appl. No.: 14/443,992

(22) PCT Filed: Nov. 19, 2013

(86) PCT No.: PCT/US2013/070798
§ 371 (c)(1),
(2) Date: May 19, 2015

(87) PCT Pub. No.: WO2014/120328
PCT Pub. Date: Aug. 7, 2014

(65) Prior Publication Data
US 2015/0336659 A1 Nov. 26, 2015

Related U.S. Application Data

(60) Provisional application No. 61/728,214, filed on Nov. 19, 2012.

(51) Int. Cl.
*B64C 21/10* (2006.01)
*F15D 1/08* (2006.01)
*B64C 30/00* (2006.01)

(52) U.S. Cl.
CPC .............. *B64C 21/10* (2013.01); *B64C 30/00* (2013.01); *F15D 1/08* (2013.01); *B64C 2230/26* (2013.01); *Y02T 50/166* (2013.01)

(58) Field of Classification Search
CPC ..... B64C 21/10; B64C 30/00; B64C 2230/26; Y02T 50/166
(Continued)

(56) References Cited

U.S. PATENT DOCUMENTS

| 3,578,264 A | * | 5/1971 | Kuethe | ................... B64C 21/10 181/220 |
| 4,664,345 A | | 5/1987 | Lurz | |

(Continued)

*Primary Examiner* — Brian M O'Hara
*Assistant Examiner* — Keith L Dixon
(74) *Attorney, Agent, or Firm* — Bradley K. Lortz; Canady & Lortz LLP

(57) ABSTRACT

A novel passive control technique for laminar flow over air transportation vehicles and space reentry vehicles flying at high supersonic and hypersonic speeds is disclosed. The control of laminar flow can be achieved by applying an array of surface roughness elements in the region before the laminar-turbulent transition. For example, an array of two-dimensional rings, stripes, or closely packed three-dimensional isolated roughness elements may be used to stabilize the instability waves and delay transition. The roughness elements may have a height between 40% and 60% of the local boundary-layer thickness. The exact location, height, and spacing of surface roughness elements may be determined by a numerical simulation strategy based on the most unstable second mode, e.g. using known $e^N$ transition prediction method, experimental measurement, or any other suitable technique.

20 Claims, 20 Drawing Sheets

(58) Field of Classification Search
USPC ..................................................... 244/200.1
See application file for complete search history.

(56) References Cited

U.S. PATENT DOCUMENTS

| | | | |
|---|---|---|---|
| 4,802,642 A | 2/1989 | Mangiarotty | |
| 4,932,612 A * | 6/1990 | Blackwelder | B64C 21/025 244/130 |
| 5,618,363 A | 4/1997 | Mullender et al. | |
| 5,884,871 A | 3/1999 | Fedorov et al. | |
| 6,092,766 A * | 7/2000 | LaRoche | B64C 21/10 244/198 |
| 6,193,191 B1 * | 2/2001 | Falcimaigne | B64C 21/10 138/37 |
| 6,332,593 B1 * | 12/2001 | Kamiadakis | B64C 23/005 244/130 |
| 6,488,238 B1 * | 12/2002 | Battisti | B64C 21/025 244/204 |
| 6,892,989 B1 | 5/2005 | Whitmore et al. | |
| 7,041,363 B2 * | 5/2006 | Krohmer | B63B 1/34 244/130 |
| 7,152,829 B2 * | 12/2006 | Bertolotti | B64C 21/06 244/209 |
| 7,318,619 B2 * | 1/2008 | Munro | B63B 1/36 114/67 R |
| 7,735,782 B2 * | 6/2010 | Kloker | B64C 21/06 244/130 |
| 8,113,469 B2 * | 2/2012 | Lang | B64C 21/10 244/198 |
| 8,302,904 B2 * | 11/2012 | McKeon | B64C 21/10 244/198 |
| 8,794,574 B2 * | 8/2014 | Lang | B63B 1/36 244/200.1 |
| 8,939,410 B2 * | 1/2015 | Exton | B64C 21/10 244/130 |
| 2004/0195462 A1 | 10/2004 | Malmuth et al. | |
| 2007/0194178 A1 * | 8/2007 | Lang | B64C 21/10 244/130 |
| 2008/0265100 A1 | 10/2008 | Crouch et al. | |
| 2010/0187361 A1 * | 7/2010 | Rawlings | B32B 3/08 244/130 |
| 2011/0262705 A1 * | 10/2011 | Gupta | B64C 21/10 428/156 |

* cited by examiner

HYPERSONIC LAMINAR FLOW CONTROL

CROSS-REFERENCE TO RELATED APPLICATIONS

This application claims the benefit of the following commonly-assigned U.S. provisional patent application:

U.S. Provisional Patent Application Ser. No. 61/728,214, filed Nov. 19, 2012, which is incorporated by reference herein.

STATEMENT OF GOVERNMENT RIGHTS

This invention was made with Government support under Grant No. FA9550-09-1-0341, awarded by the United States Air Force, Air Force Office of Scientific Research. The Government has certain rights in the invention.

BACKGROUND OF THE INVENTION

1. Field of the Invention

The present invention relates to surface design of vehicles, and particularly to the surface design of hypersonic vehicles.

2. Description of the Related Art

The transition of boundary-layer flows over hypersonic vehicle surfaces significantly affects the performance of hypersonic transportation vehicles and re-entry vehicles and the design of their thermal protection systems. The boundary-layer transition can have a first-order impact on lift, drag, control, and heat transfer properties of the vehicles. The ability to control the onset of transition to maintain laminar boundary-layer flows by delaying transition can result in lower drag, lower heat flux to surface, and higher fuel efficiency in hypersonic vehicles.

U.S. Patent Application Publication No. 2008/0265100 A1, entitled "Laminar Flow Surfaces with Selected Roughness Distributions, and Associated Methods," is hereby incorporated by reference, and discloses a representative method for designing airfoils economically. The method enables the design of sweep wing beyond the maximum sweep angle typically associated with natural laminar flow wings, but without adding powered devices (cooling and/or blowing devices), by controlling surface roughness so that the disturbance amplification due to steady cross-flow instabilities is small enough to maintain laminar flow. According to this method, the maximum of the allowable surface roughness value is obtained. The associated manufacturing cost of wing surface is lowered because surface roughness does not need to be kept at very low value for the whole surface. Strictly speaking, this method is not for laminar flow control. It is more focus on lowering the manufacturing cost of sweep wings. The details of the effect of surface roughness on flow instabilities are not considered.

U.S. Pat. No. 6,892,989 B1, entitled "Method for Reducing The Drag of Blunt-Based Vehicles by Adaptively Increasing Forebody Roughness," is hereby incorporated by reference, and provides a method for reducing total drag upon a blunt-based vehicle by adaptively increasing forebody roughness. Although the roughness leads to drag increase in the roughened area of the forebody, it significantly decreases drag at the base of the vehicle. As a result, total drag upon the vehicle decreases. It is quite clear that roughness here is used to trip flow transition.

U.S. Patent Application Publication No. 2004/0195462 A1, entitled "Surface Plasma Discharge for Controlling Leading Edge Contamination and Crossflow Instabilities for Laminar Flow," is hereby incorporated by reference, and provides a method to delay transition associated with the leading edge contamination and crossflow instabilities by a complex closed-loop feedback control system. In this method, the control of the leading edge contamination and crossflow instabilities is achieved by changing Reynolds number of the supersonic boundary layer with volumetric heating introduced to the flow by plasma discharges. However, it is difficult to use such a complex system for a hypersonic boundary layer.

U.S. Pat. No. 5,884,871, entitled "Use of Absorbing Walls for Laminar Flow Control," is hereby incorporated by reference, and provides a method for hypersonic laminar flow control by using ultrasonically transparent coating on the body surface. The pore size needs to be much less than the boundary-layer thickness so that the coating roughness will not trip the boundary layer. The porous coating absorbs energy from the second mode hence stabilizes flow. However, porous coating generally has no effect on the mean flow and the instability of the second mode, which make it difficult to achieve the efficient stabilization of hypersonic flows. The manufacturing of porous coating and the attachment of porous coating to body surface are not so convenient.

Employing a porous coating as described in U.S. Pat. No. 5,884,871 generally has no effect on the mean flow and the stability characteristics of the laminar flow. It stabilizes laminar flow by absorbing energy for the second mode. It is sometimes difficult for a porous coating to achieve efficient stabilization of hypersonic flows. For example, a porous coating destabilizes the first mode when it is located upstream of the synchronization point. In addition, the stabilization of porous coating depends on material properties of the coating and covering the vehicle surface with porous coatings may affect the strength and aerodynamic performance of the vehicle. Finally, it may be very difficult to put several porous coatings on a vehicle surface at different locations and removal of porous coatings from vehicle surface is difficult as well.

U.S. Pat. No. 5,618,363, entitled "Method of Manufacturing A Porous Material," is hereby incorporated by reference, and discloses a manufacturing method of porous material. The method is essential for the laminar control method in U.S. Pat. No. 5,884,871, but it is not a method to control laminar flow.

U.S. Pat. No. 4,802,642, entitled "Control of Laminar Flow in Fluids by Means of Acoustic Energy," is hereby incorporated by reference, and provides a method for laminar flow control by radiating acoustic energy into the boundary layer. The frequencies of the acoustics are greater than twice that of the critical Tollmein-Schlichting wave. Although the method is valid for subsonic flows, it is difficult to be applied to hypersonic flows. The method also requires a complicated system for acoustic generators and its control.

U.S. Pat. No. 4,664,345, entitled "Method for Stabilizing Laminar Separated Boundary Layers," is hereby incorporated by reference, and provides a method to stabilize separated laminar boundary layers. The goal is achieved by suction and blowing inlets in the surface just upstream and downstream of the disturbance. This method is efficient for boundary layers experiencing a high pressure gradient. It is not valid for flow transition caused by instabilities.

For high Mach number flows (i.e. hypersonic flows), surface roughness has been previously used to trip boundary-layer transition by putting it near the leading edge of body surface. The height of surface roughness is generally higher than the local boundary-layer thickness. The stabilization effect of surface roughness has been mentioned in a couple of journal papers by experimentalists as failures of studies of how to trip transition efficiently when the height of roughness is lower than the local boundary-layer thickness. However, no explanation or further demonstration was reported. Surface roughness is currently still treated as a tool to trip hypersonic boundary-layer transition.

A review of the foregoing patents and applications shows there are quite limited methods for the control of hypersonic laminar flow of the boundary layer. Two methods in U.S. Patent Application Publication No. 2004/0195462 A1 and U.S. Pat. No. 5,884,871 are valid for hypersonic flows. However, the described techniques are complex and difficult to implement. There is a need in the art for techniques for controlling supersonic laminar flow of the boundary layer that are simple and convenient. There is a need for such techniques to be passive, depending only upon geometric parameters independent of material properties. In addition, there is a need for such techniques to efficient and flexible to design and manufacture without requiring changes to the fundamental vehicle structure. There is further a need for such techniques to be adjustable on a particular vehicle. These and other needs are met by embodiments of the present invention as detailed hereafter.

SUMMARY OF THE INVENTION

A novel passive control technique for laminar flow over air transportation vehicles and space reentry vehicles flying at high supersonic and hypersonic speeds is disclosed. The control of laminar flow can be achieved by applying an array of surface roughness elements in the region before the laminar-turbulent transition. For example, an array of two-dimensional rings, stripes, or closely packed three-dimensional isolated roughness elements may be used to stabilize the instability waves and delay transition. The roughness elements may have a height between 40% and 60% of the local boundary-layer thickness. The exact location, height, and spacing of surface roughness elements may be determined by a numerical simulation strategy based on the most unstable second mode, e.g. using known $e^N$ transition prediction method, experimental measurement, or any other suitable technique.

A typical embodiment of the invention comprises a supersonic vehicle, comprises an exterior surface section having a leading edge for receiving compressible fluid flow over the exterior surface, and one or more surface roughness elements disposed on the exterior surface section to damp disturbances of the flow over the exterior surface. The one or more surface elements are disposed on the exterior surface no closer to the leading edge than a synchronization point of mode S and mode F of the flow over the exterior surface section. This embodiment of the invention may be further modified consistent with other apparatus or method embodiments described herein.

Similarly, a typical method embodiment of the invention for damping disturbances of flow over a supersonic vehicle, comprises determining for an exterior surface section having a leading edge a most unstable frequency of compressible fluid flow over the exterior surface, determining a synchronization point of mode S and mode F of the flow over the exterior surface section from the leading edge, and disposing one or more surface roughness elements on the exterior surface section no closer to the leading edge than the synchronization point of mode S and mode F. This embodiment of the invention may be further modified consistent with other apparatus or method embodiments described herein.

In further embodiments of the invention, the one or more surface elements may be disposed on the exterior surface upstream of laminar-turbulent transition of the flow over the exterior surface section from the leading edge. The one or more surface roughness elements may comprise a height from the exterior surface section of between 40% and 60% of a local boundary-layer thickness of the flow over the exterior surface section. In addition, the one or more surface roughness elements may be spaced along the exterior surface section in a direction of the flow between ten and twenty times the roughness element height.

In some embodiments, the one or more surface roughness elements may comprise two-dimensional elements each formed by a cross-sectional area swept along a line substantially perpendicular to a direction of the flow along the exterior surface section. The exterior surface section may comprise a two dimensionally bounded area and the two-dimensional elements comprise stripes having ends at edges of the two dimensionally bounded area. Alternately, the exterior surface section may comprises a three dimensional surface and the two-dimensional elements comprise rings such that each cross sectional area is swept along the line that closes on itself.

In other embodiments, the one or more surface roughness elements may comprise three-dimensional elements each formed by surface bumps spaced along a line substantially perpendicular to a direction of the flow along the exterior surface section. The exterior surface section may comprise a two dimensionally bounded area and each line of surface bumps ends at edges of the two dimensionally bounded area. Alternately, the exterior surface section may comprise a three dimensional surface and each line of surface bumps are disposed along the line that closes on itself.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings in which like reference numbers represent corresponding parts throughout.

DETAILED DESCRIPTION INCLUDING THE PREFERRED EMBODIMENT

1. Overview

Figure 1A:
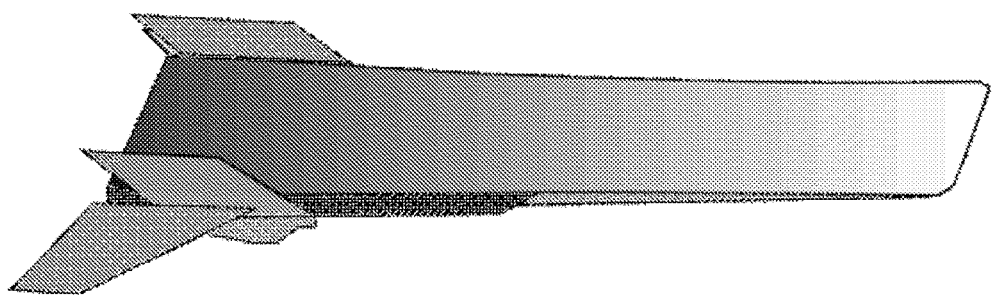
FIG. 1 shows three schematics of hypersonic vehicle surface forms, a flat wing, a conical form, and hybrid, respectively.

The present application discloses a novel passive control strategy for laminar flows over air transportation vehicles and space reentry vehicles flying at high supersonic and hypersonic speeds by using surface roughness to maintain laminar flow by delaying the laminar-turbulent transition. (As used in the present application, applicable flow speed may simply be referenced as "supersonic" which will be understood to include hypersonic speeds, i.e. above Mach 5.) The strategy is focused on flow transition caused by the so called second mode instability. It can be applied to supersonic and hypersonic airplanes and space reentry vehicles. The technique of using such surface roughness elements to stabilize hypersonic boundary layers has not been previously described.

The control of laminar flow can be achieved by applying an array of surface roughness elements in the region before the laminar-turbulent transition. The control of laminar flows is achieved by applying one or more surface roughness elements in the region before laminar-turbulent transition. For example, an array of two-dimensional rings, stripes, or closely packed three-dimensional isolated roughness elements may be used to stabilize the instability waves and delay transition. The roughness elements have a height between 40% and 60% of the local boundary-layer thickness so that it does not trip the boundary layer. The exact location, height, and spacing of surface roughness elements may be determined by a numerical simulation strategy based on the most unstable second mode. The frequency of the most unstable second mode can be determined using the known $e^N$ transition prediction method, experimental measurement, or any other suitable method. The new technique is simple and efficient.

The novel control technique can be applied to supersonic and hypersonic airplanes and space reentry vehicles. Examples of the types of commercial applications and products our invention may lead to include, but are not limited to, NASA X-43 hypersonic aircraft, NASA X-38 spacecraft, space shuttles, and reentry capsules. It can delay transition, thus substantially reducing drag force and surface heating and increasing fuel efficiency of hypersonic vehicles. Embodiments of the present invention may also be implemented in the production of various standard surface roughness elements, which can be readily attached to or removed from the vehicle surface.

The novel control technique is especially valid for laminar flows over air transportation vehicles and space reentry vehicles flying at high supersonic and hypersonic speeds where the supersonic layer exists in the bottom portion of the boundary layer. In contrast, plasma discharges employed in the techniques described in U.S. Patent Application Publication No. 2004/0195462 A1 require a complex system for energy generation and its control. It is difficult to use such a complex technique for a hypersonic boundary layer. In addition, embodiments of the present invention are simpler and more efficient than that of the passive control of hypersonic flow by using porous coating described in U.S. Pat. No. 5,884,871.

In contrast to other control techniques, particularly those using porous coatings, embodiments of the present invention afford many advantages. Employing surface roughness elements in accordance with the present invention changes the mean flow and the stability characteristics of the laminar flow and enable efficient stabilization by disposing roughness elements downstream of the synchronization point. In addition, the stabilization of surface roughness only depends on geometric parameters of surface roughness elements and is independent of material properties. The manufacturing of surface roughness elements is simple, particularly when compared to manufacturing using porous coating stabilization. The surface roughness elements can be affixed or removed from vehicle surfaces easily affording enhanced design and manufacturing flexibility. Change of roughness size and location is also possible without changing fundamental structure of the vehicle. Multiple surface roughness elements can also be adhered to vehicle surfaces at different locations to enhance the stabilization effect.

2. Controlling Supersonic Laminar Flow of the Boundary Layer

A novel passive control technique for laminar flows over air transportation vehicles and space reentry vehicles flying at high supersonic and hypersonic speeds by using surface roughness is disclosed and demonstrated to maintain laminar flow by delaying the laminar-turbulent transition. "Flow" as used hereafter refers to compressible fluid flow (e.g. air) relative to a surface, e.g. an airfoil surface, as will be understood by those skilled in the art. The technique is focused on flow transition caused by the so called second mode instability. Transition mechanisms relating to other flow physics are not considered, such as transient growth, bypass transition, etc. The new technique is simple and efficient. It can delay transition, thus substantially reducing drag force and surface heating and increasing fuel efficiency of hypersonic vehicles. Hence, the new technique can be applied to current supersonic and hypersonic vehicles and the design of future vehicles to improve their performance.

Figure 1B:
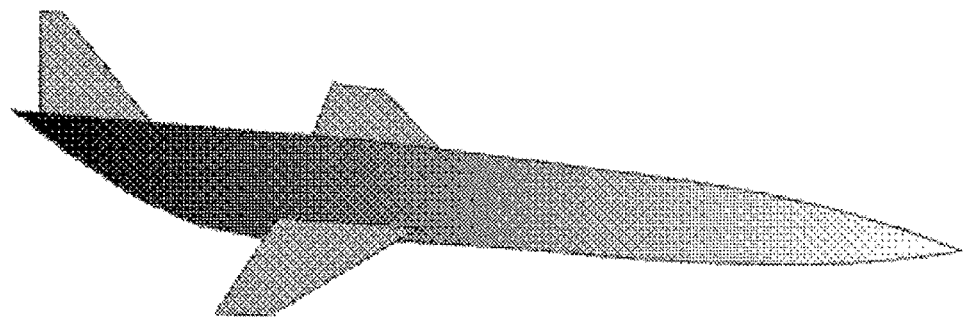
Figure 1C:
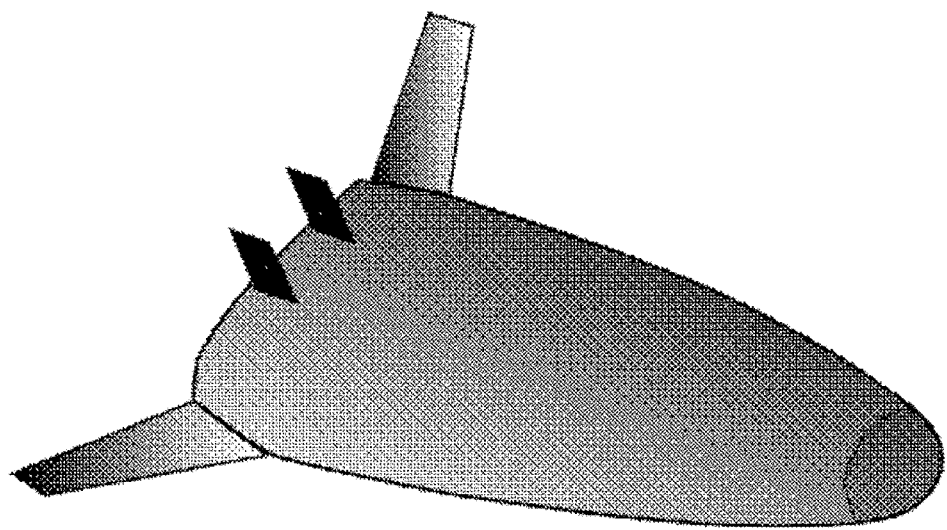

FIGS. 1A-1C show three schematics of hypersonic vehicle surface forms, a flat wing, a conical form, and a hybrid form, respectively. However, embodiments of the invention are applicable to any vehicle form capable of operating at supersonic speeds employing the principles described hereafter as will understood by those skilled in the art.

Laminar-turbulent transition, or transition, is one of the most critical research topics of a hypersonic boundary layer. Based on the movement of compressible fluid, there are two types of flows: laminar flow and turbulent flow. Laminar flow occurs when a fluid flows in parallel layers, with no disruption between the layers. For laminar flow, there are no cross currents perpendicular to the direction of flow. Turbulent flow is a flow regime characterized by chaotic and stochastic property changes such as rapid variation of pressure and velocity in space and time. The process of a laminar flow becoming turbulent is known as laminar-turbulent transition.

For laminar flow over supersonic and hypersonic vehicles in real flight conditions, the second mode is generally the dominant unstable wave. The transition of boundary-layer flow from laminar to turbulent is induced by the significant amplification of the second mode. The structure of boundary-layer flow at high supersonic and hypersonic regime is quite different from that at low-speed regime.

Figure 2:
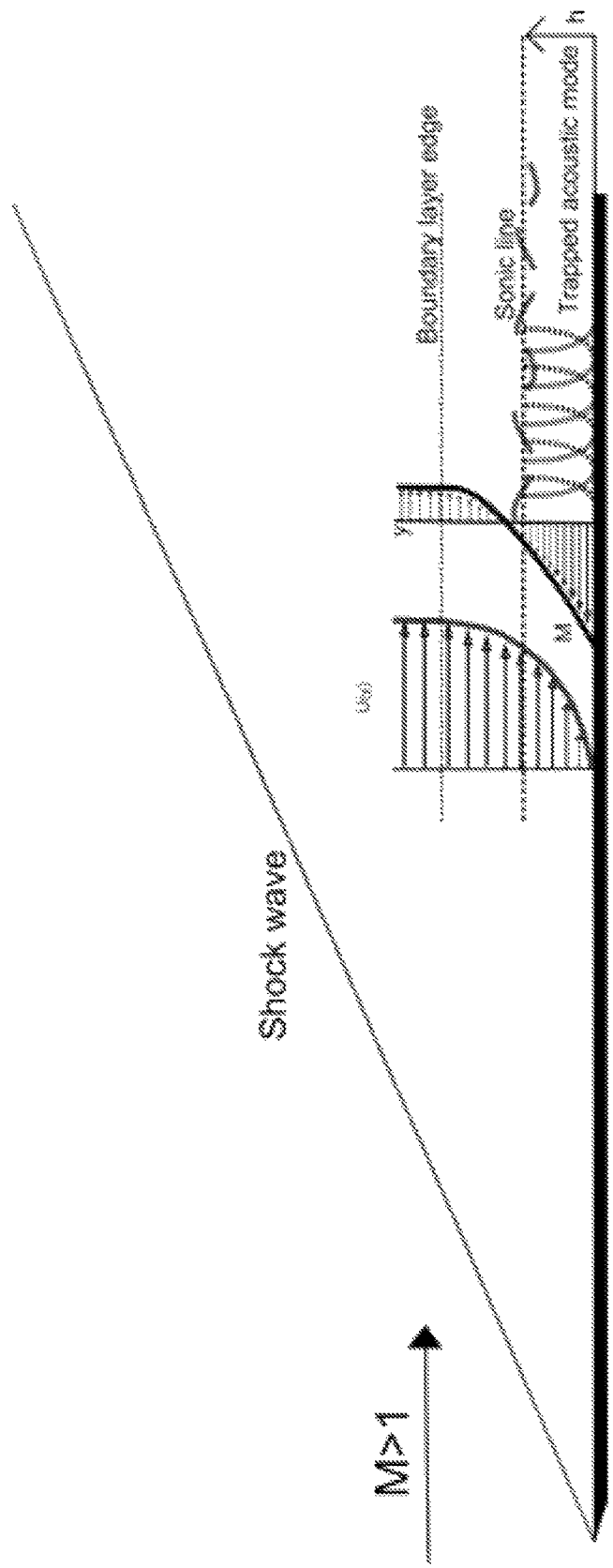
FIG. 2 is an illustration of a flow structure for a flat-plate hypersonic boundary layer.

FIG. 2 shows a schematic of the flow structure of a supersonic boundary layer over a flat plate surface. Between the surface and the sonic line, there is a supersonic layer in the bottom portion of the boundary layer where the flow is supersonic relative to the disturbance phase velocity. In contrast, the supersonic layer does not exist in subsonic and low supersonic boundary layers. The existence of the supersonic layer is critical because the second mode is associated with the family of trapped acoustic modes propagating in the supersonic layer.

Figure 3:
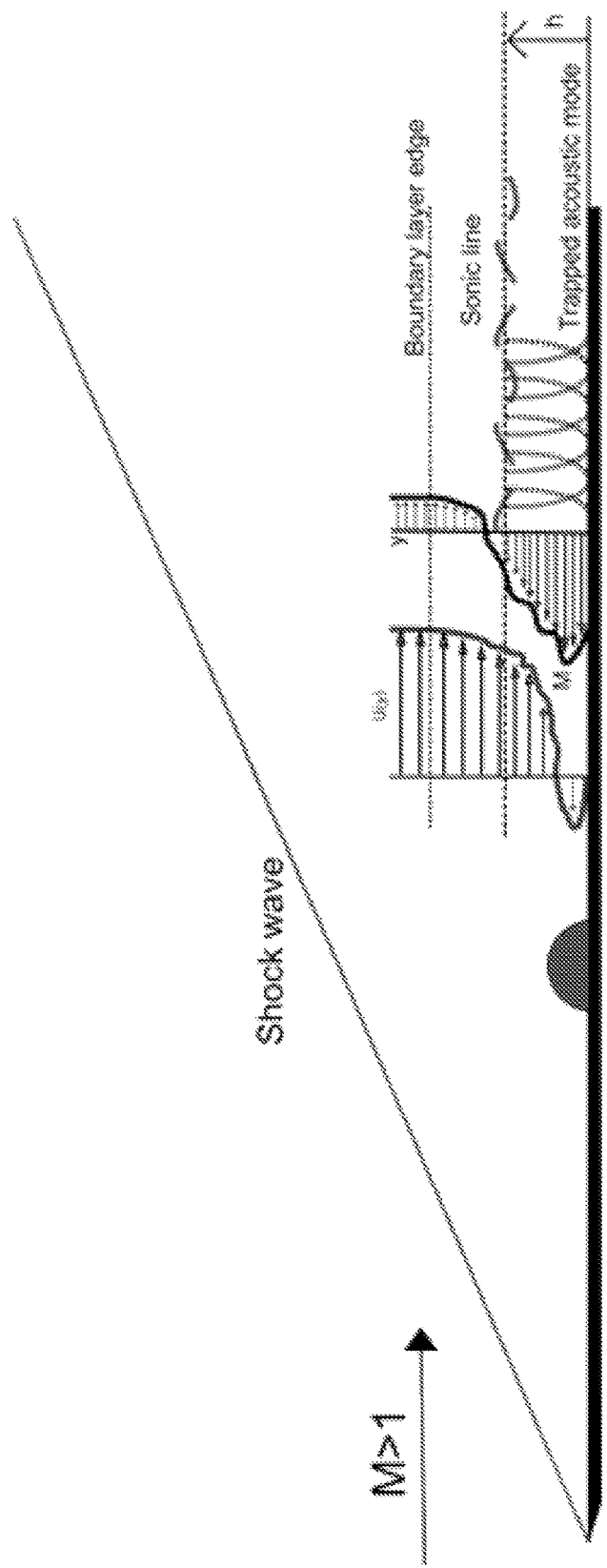
FIG. 3 illustrates a corresponding flow structure of a flat-plate hypersonic boundary layer disturbed by surface roughness.

FIG. 3 shows a schematic of the flow structure of a supersonic boundary layer over a flat plate surface having a surface roughness element attached to the surface. In this case, the surface roughness element strongly disturbs the supersonic layer in the boundary layer near the roughness element and increases the height of the local sonic line. As a result, the second mode is significantly changed when it propagates over the roughness element.

In the environment of hypersonic flight, mode S and mode F are generally excited near the leading edge of the vehicle, where the speed of mode F is higher than that of mode S. As these two waves propagate downstream inside the boundary layer, the speed of mode F decreases whereas the speed of mode S increases. As a result, the speed of mode F is the same as that of mode S at a certain location. This location is called the synchronization point. Although the "synchronization point" is defined as a "point" because a flow over a surface is typically viewed as a two-dimensional cross section of the flow, those skilled in the art will appreciate that for a three dimensional surface the synchronization "point" is actually the curve formed by the synchronization points of adjacent flow cross sections. Accordingly, the term "synchronization point" shall be used in the present application equally referring to either a "point" in a specific cross section or the curve of synchronization points over a three dimensional surface.

After the synchronization point, one of mode S and mode F generally becomes significantly unstable due to some complex interactions of these two modes at the synchronization point. The unstable mode is quickly amplified as it propagates further downstream. When the unstable mode reaches certain amplitude, the laminar-turbulent transition occurs in the boundary layer. Accordingly, the transition point is always downstream of the synchronization point. Embodiments of the present invention operate to stabilize the significantly unstable mode after the synchronization point to either move the transition further downstream or even prevent the transition.

From numerical simulations, it can be demonstrated that the second mode is stabilized only when the roughness element is located downstream of the synchronization point of mode S and mode F. The two waves, known in the art as mode S and mode F, are so-called because they are tuned to slow and fast acoustic waves, respectively, in the limit of small Reynolds numbers. Mode F is generally stable whereas mode S is unstable in the region bounded by a neutral curve. The second mode refers to mode S downstream of the synchronization point. For a given hypersonic boundary layer, the synchronization point and the growth rate of mode S can be predicted by the linear stability theory.

The control strategy employed by embodiments of the invention can be applied to supersonic and hypersonic airplanes and space reentry vehicles, such as space shuttle and reentry capsule. The thermochemical non-equilibrium effects of hypersonic flows can be considered if they are necessary. The control of laminar flows is achieved by applying an array of surface roughness in the region before laminar-turbulent transition. The roughness can have a height between 40% and 60% of the local boundary-layer thickness so that it does not trip the boundary layer. In addition, spacing between multiple lines or rows of surface roughness elements may typically be about 10-20 times the roughness element height.

The precise location, height, and spacing of surface roughness elements may be determined by a numerical simulation strategy based on the most unstable second mode. The frequency of the most unstable second mode can be determined with the help of the $e^N$ transition prediction method, experimental measurement, or some other means. Taking $e^N$ method as an example, it is assumed that laminar flows transition to turbulence when the amplification of the dominant second mode reaches $e^N$ times. Although the N factor strongly depends on vehicle geometry and flow condition, there is generally an expected N factor for a specific design of hypersonic vehicle. For example, the N factor of the second mode related transition of hypersonic flat-plate boundary layers is generally 5-6 in traditional wind tunnel experiments and 8-9 in quiet tunnel experiments or real flight tests. Based on the design N factor and the growth rate of the second mode calculated by the linear stability theory, one can determine the frequency of the dominant second mode instability and the corresponding synchronization point. It can be shown by simulation of surface roughness elements downstream of the synchronization point that laminar flow is maintained by delaying flow transition.

Figure 4A:
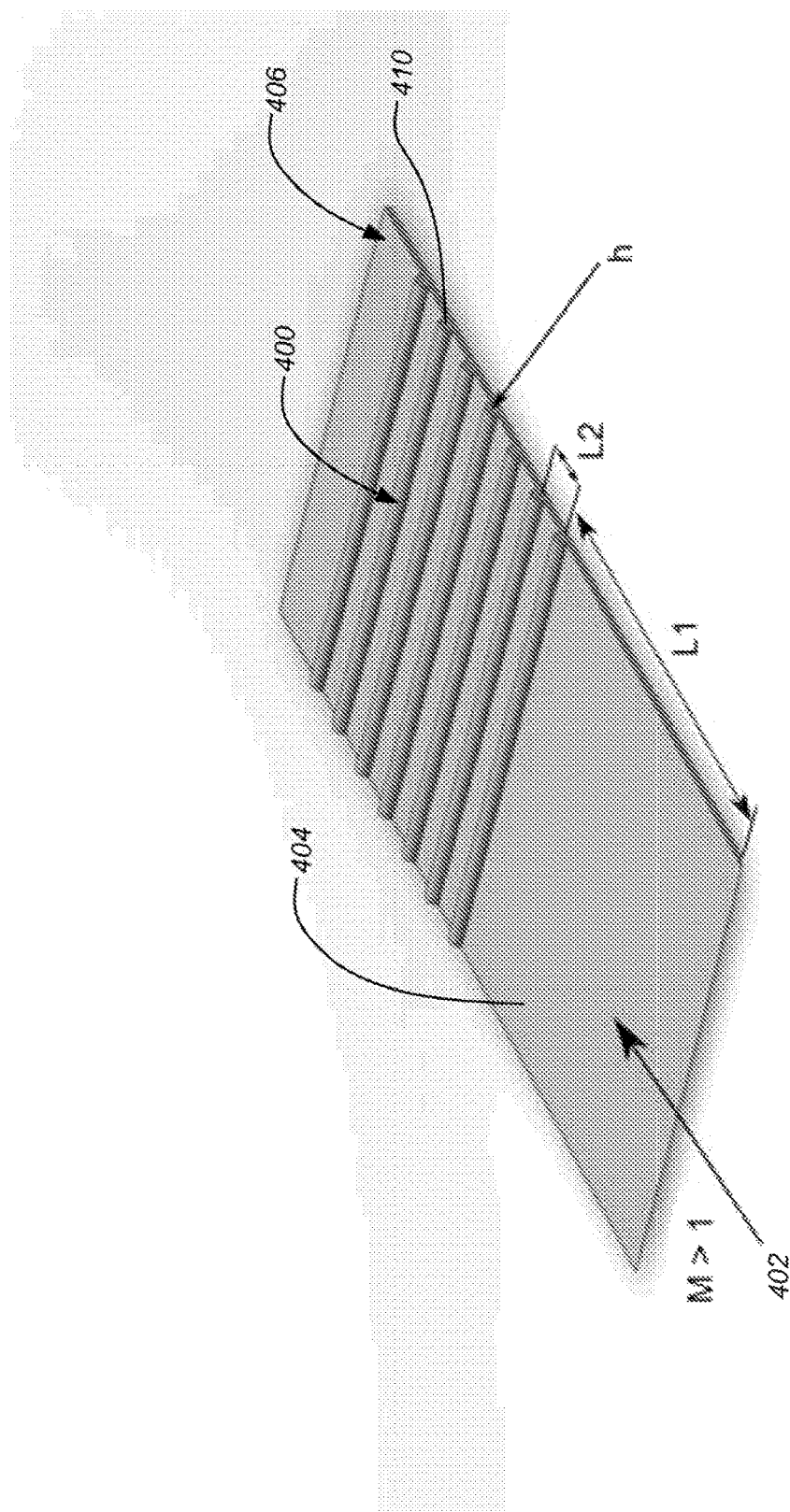
FIG. 4 illustrates two-dimensional roughness elements comprising stripes over a flat plate and rings over a pointed cone.
Figure 4B:
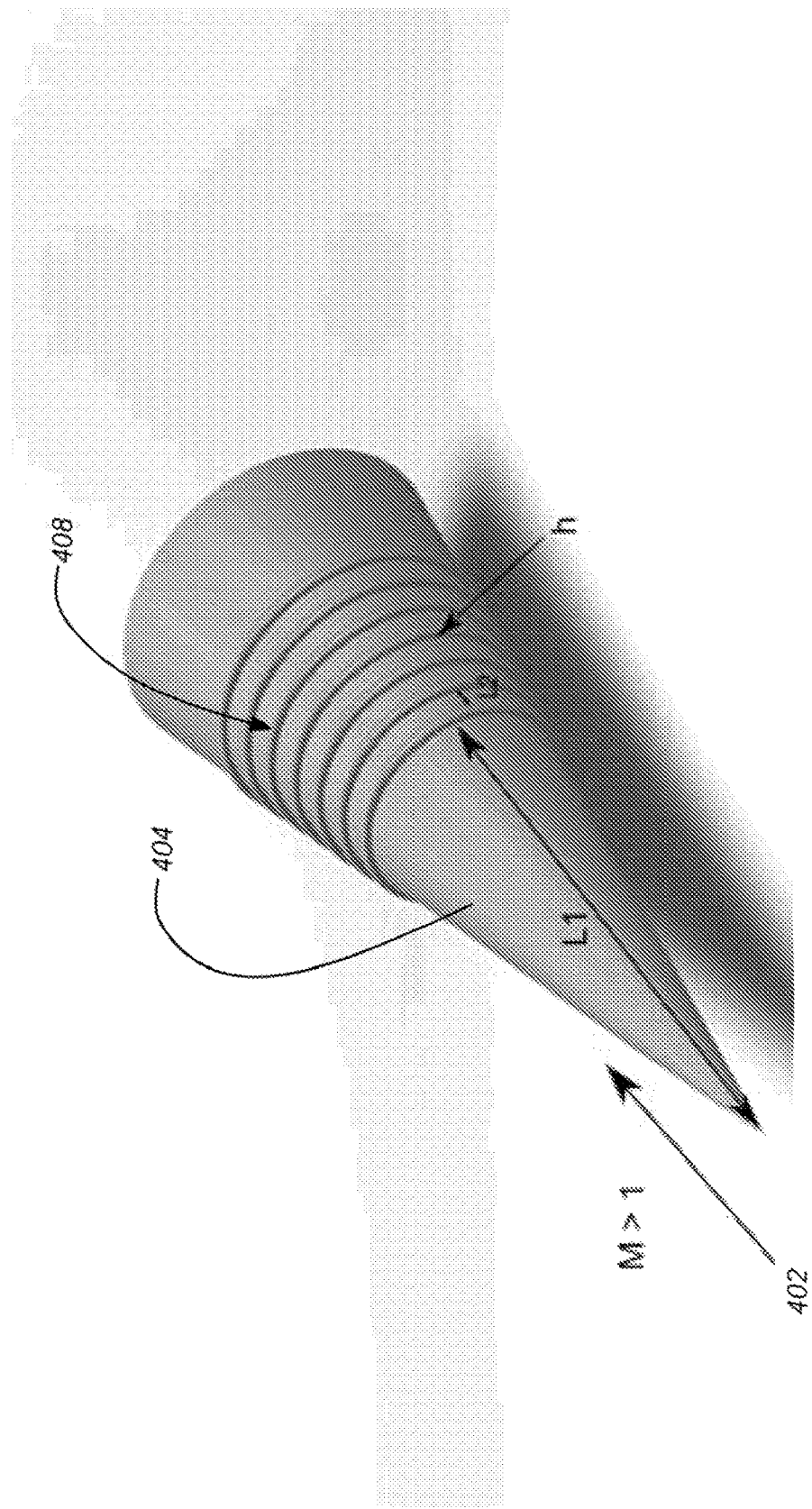

FIGS. 4A and 4B show one or more surface roughness elements (e.g. stripes or rings), formed by two-dimensional elements, can be used to stabilize hypersonic boundary layers over a flat plate and cone, respectively. The one or more surface roughness elements may comprise two-dimensional elements 400 each formed by a cross-sectional area swept along a line substantially perpendicular to a direction of the flow 402 along the exterior surface section 404. For example, the cross-sectional area may be a semi-circular area. The exterior surface section 404 from the supersonic vehicle may be a two-dimensionally bounded area 406 (e.g. idealized as a flat plate) as shown in FIG. 4A. In the case of such a two-dimensionally bounded area 406, the line of the swept cross-sectional area has ends at edges 410 of the two dimensionally bounded area 406. Note that although the two-dimensionally bounded area 406 is shown on a flat plate, those skilled in the art will appreciate that it is also applicable to a three dimensional surface. Relatedly, the line of the swept cross-sectional may not be straight in this case as it will follow a curve of such a three-dimensional surface. Those skilled in the art will understand the definition of "line" in this context includes "curved" lines applicable to three dimensional surfaces. FIG. 4B shows two-dimensional elements 400 comprising rings 408 such that each cross sectional area is swept along a line that closes on itself. In this case, the exterior surface section 404 is three-dimensional and has a shape (e.g. conical) such that the line of the swept cross sectional area can close on itself (forming the rings 408) while also remaining substantially perpendicular to the direction of flow 402.

Figure 5A:
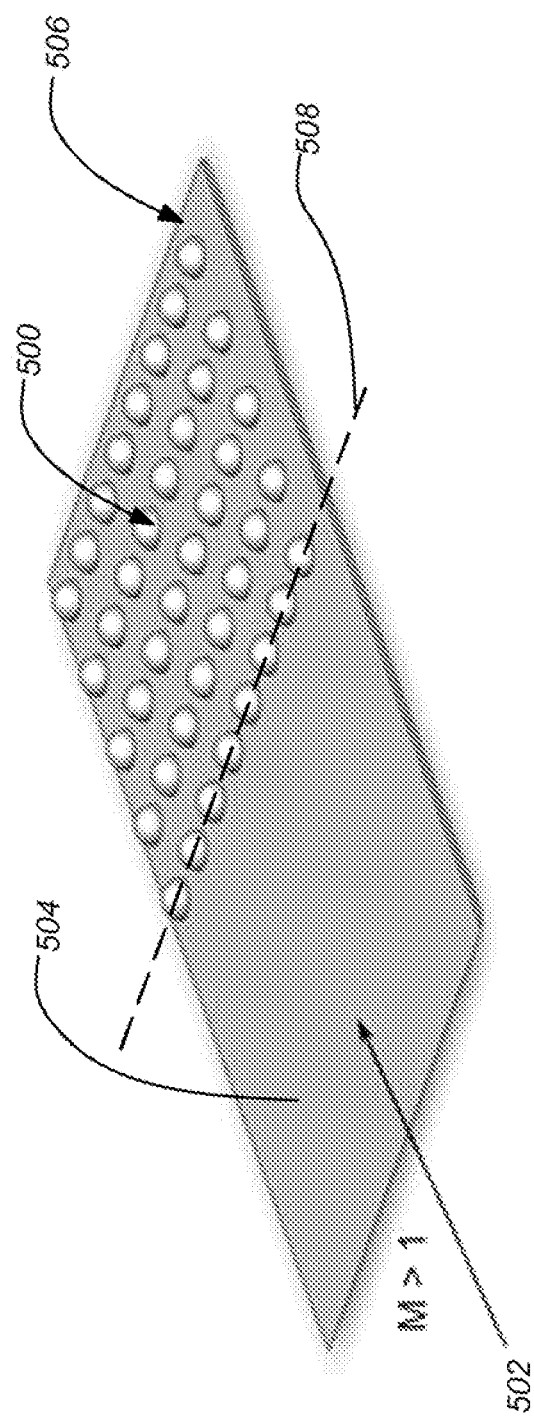
FIG. 5 illustrates distinct closely-packed three dimensional roughness elements on a flat plate and on a pointed cone.
Figure 5B:
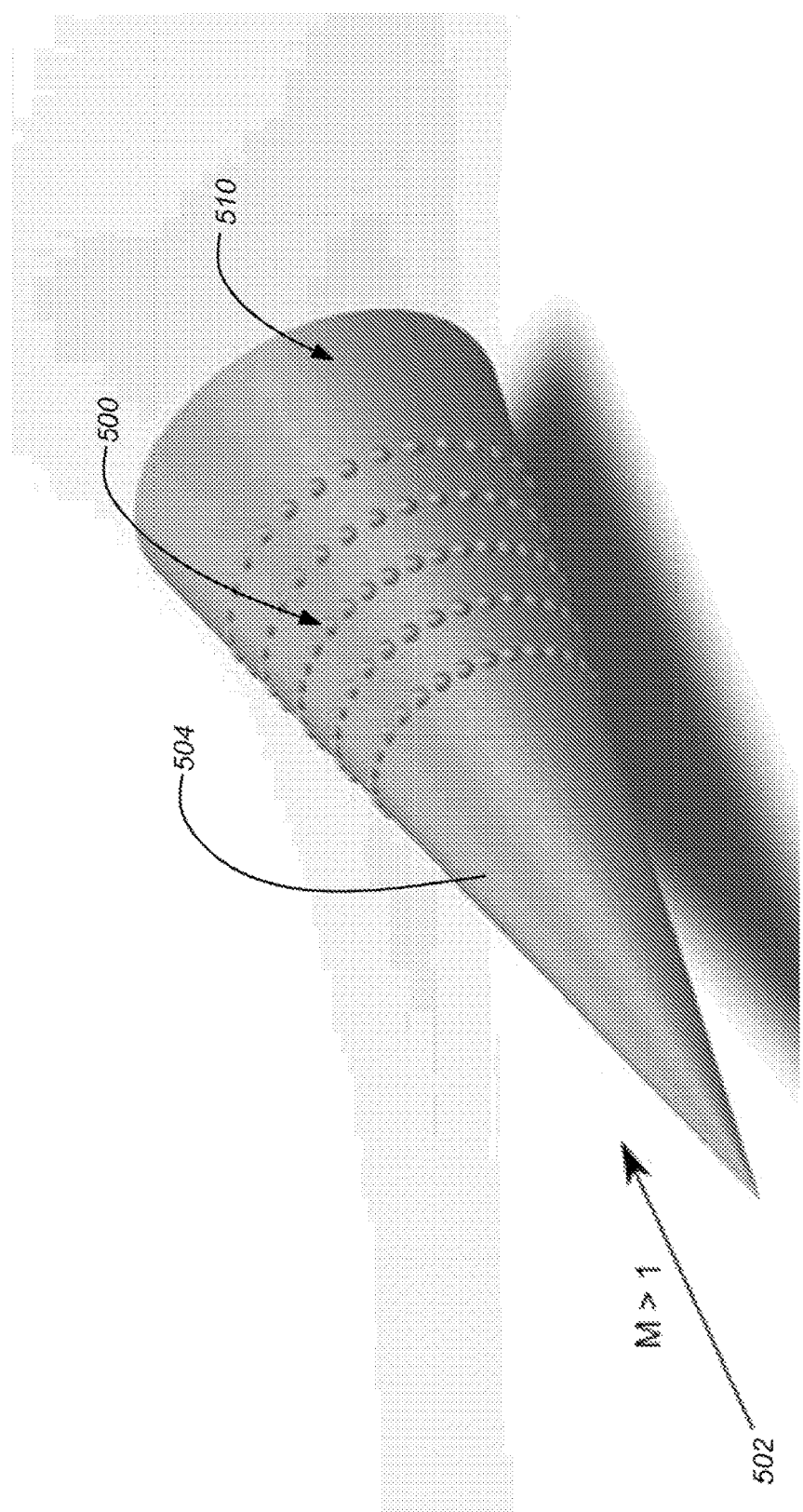

FIGS. 5A and 5B show the same principle applied to yield closely packed three-dimensional isolated roughness elements periodic in spanwise direction. Here, the one or more surface roughness elements comprise three-dimensional elements 500 each formed by surface bumps spaced along a line 508 substantially perpendicular to a direction of the flow 502 along the exterior surface section 504. (The spacing line is analogous to the line of swept cross-sectional area of FIGS. 4A and 4B.) Similar to FIG. 4A, where the exterior surface section 504 comprises a two dimensionally bounded area, each line of surface bumps ends at edges of the two dimensionally bounded area in FIG. 5A. Note that although the two-dimensionally bounded area 506 is shown on a flat plate, those skilled in the art will appreciate that it is also applicable to a three dimensional surface. Relatedly, the spacing line of the surface bumps may not be straight in this case as it will follow a curve of such a three-dimensional surface. Those skilled in the art will understand the definition of "line" in this context includes "curved" lines applicable to three dimensional surfaces. FIG. 5B shows an exterior surface section comprising a three dimensional surface 510 (e.g. conical) and each line of surface bumps are disposed along a line that closes on itself (not shown explicitly in FIG. SB but comprises an imaginary line formed by each ring of bumps).

Figure 6:
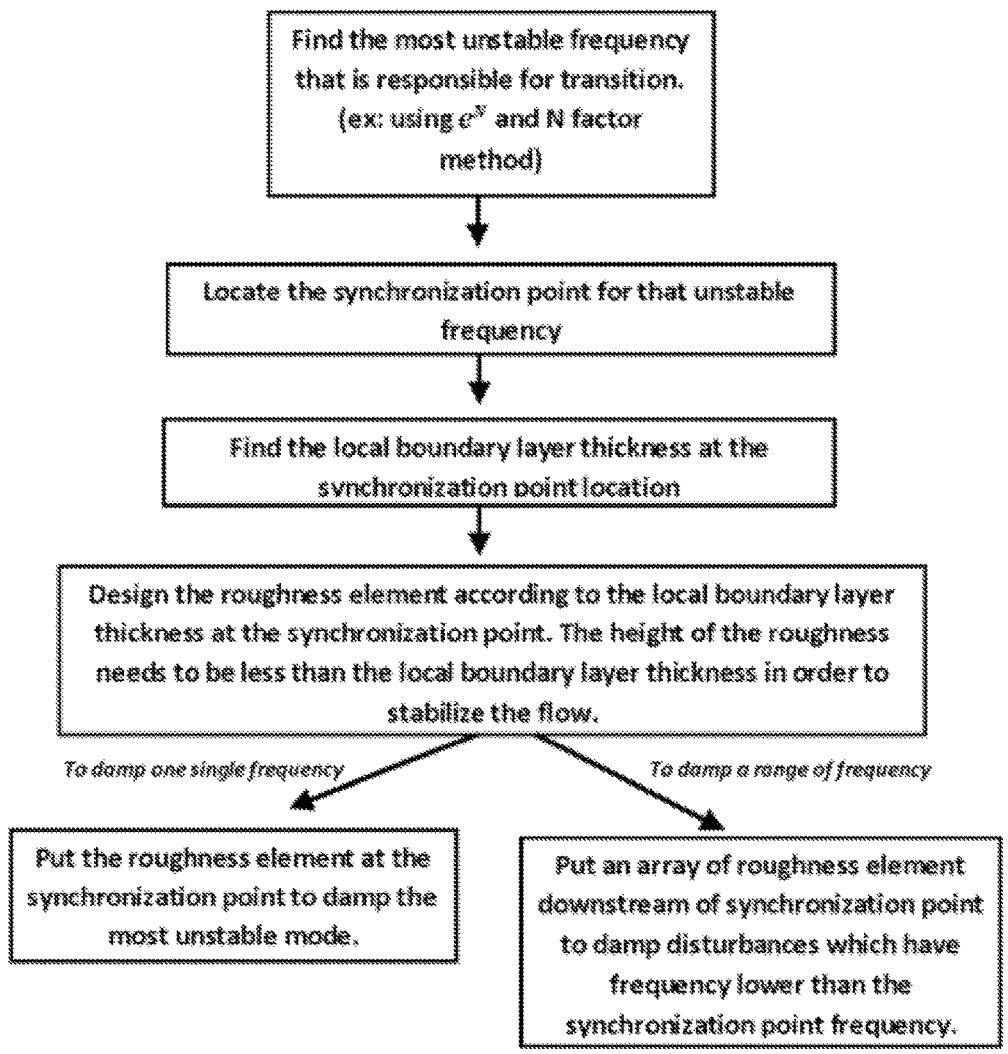
FIG. 6 is a flow chart of a supersonic laminar flow control method in accordance with the present invention.

FIG. 6 is a flowchart of an exemplary method of the flow control technique where the most unstable frequency that is responsible for transition can be determined with the assistance of the known $e^N$ transition prediction method, experimental measurement, or any other suitable means known in the art. The most unstable frequency responsible for laminar-turbulent transition is first determined, e.g. using the known $e^N$ and N factor method. Next, the synchronization point for the determined most unstable frequency is located and the local boundary layer thickness at the synchronization point is also determined. The synchronization point and local boundary layer thickness are then used to design the one or more roughness elements; the height of the roughness elements should be less than the local boundary layer thickness (and ideally 40%-60% of said thickness) in order to aid flow stabilization. The one or more roughness elements may then be disposed on the vehicle surface in a range of locations depending upon the desired frequency to be damped. For example, disposing a roughness element at the synchronization point will aid to damp the most unstable mode, whereas disposing a plurality of roughness elements downstream of the synchronization point with aid damping disturbances which have a frequency lower than that of the synchronization point.

Figure 7A:
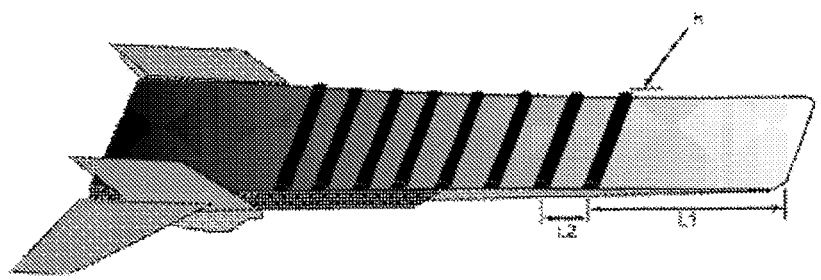
FIGS. 7A-7C show schematics of hypersonic vehicle surface forms, a flat wing, a conical form, and a hybrid form, respectively, using one or more surface roughness elements (e.g. stripes or rings), formed by two-dimensional elements.
Figure 7B:
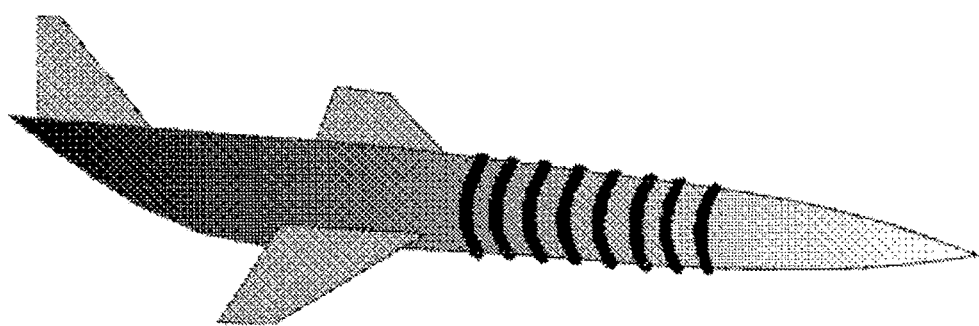
Figure 7C:
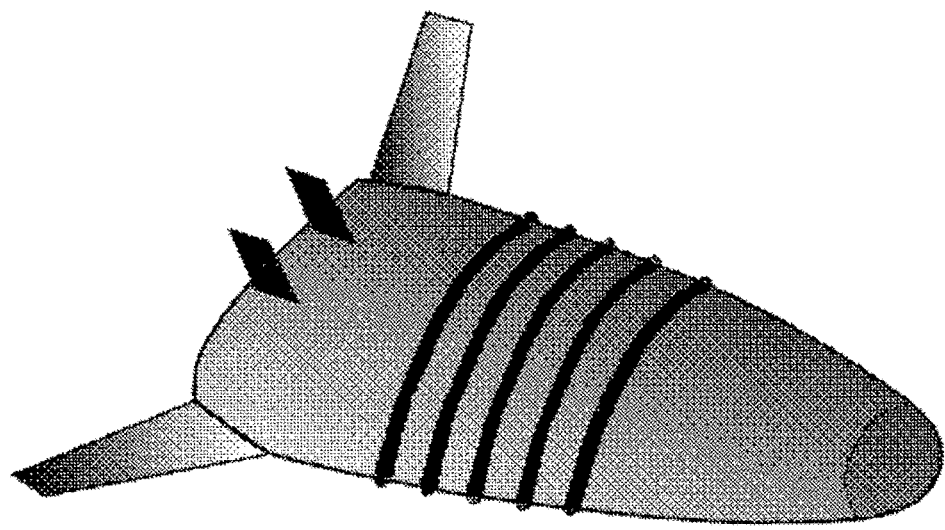
Figure 8A:
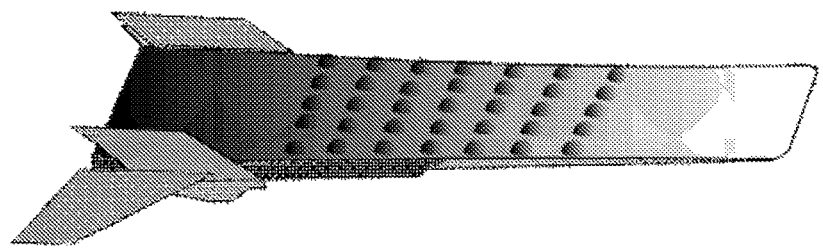
FIGS. 8A-8C show schematics of hypersonic vehicle surface forms, a flat wing, a conical form, and a hybrid form, respectively, using lines of surface roughness elements, formed by three-dimensional elements.
Figure 8B:
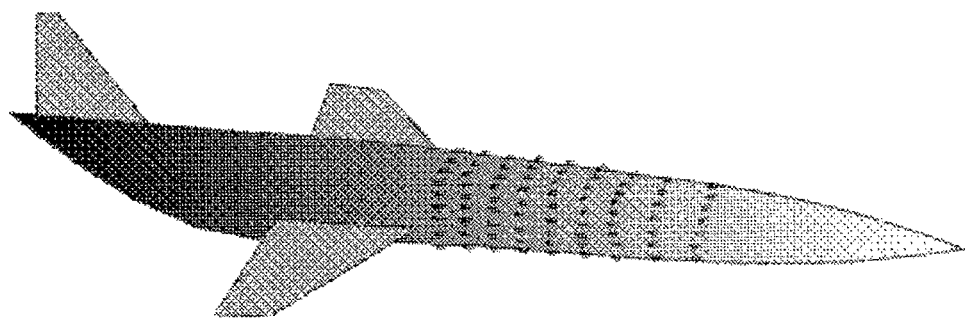
Figure 8C:
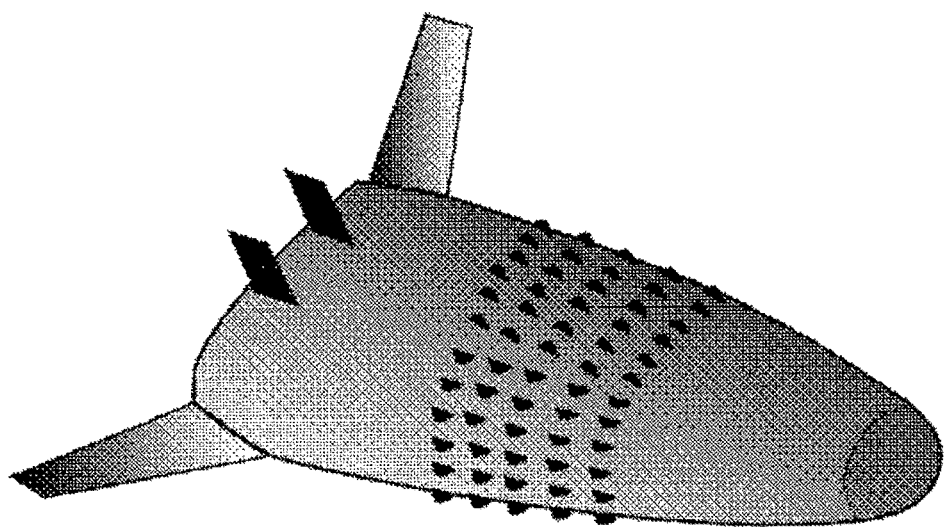

FIGS. 7A-7C show schematics of hypersonic vehicle surface forms, a flat wing, a conical form, and a hybrid form, respectively, using one or more surface roughness elements (e.g. stripes or rings), formed by two-dimensional elements, e.g. as described in FIGS. 4A and 4B. Similarly, FIGS. 8A-8C show schematics of hypersonic vehicle surface forms, a flat wing, a conical form, and a hybrid form, respectively, using lines of surface roughness elements, formed by three-dimensional elements, e.g. as described in FIGS. 5A and 5B. The new technique can improve the design of current and future hypersonic vehicles, such as the NASA X-34 landspeeder, and may also be applied in the production of various standard surface roughness elements, which can be readily attached to or removed from a vehicle surface. If it is necessary, one or more surface roughness elements can be attached to the vehicles at various locations to enhance laminar flow stabilization. Note that the parameters of roughness element, L1, L2 and h, can be adjusted according to the analysis of the roughness location, height, and spacing.

Figure 9:
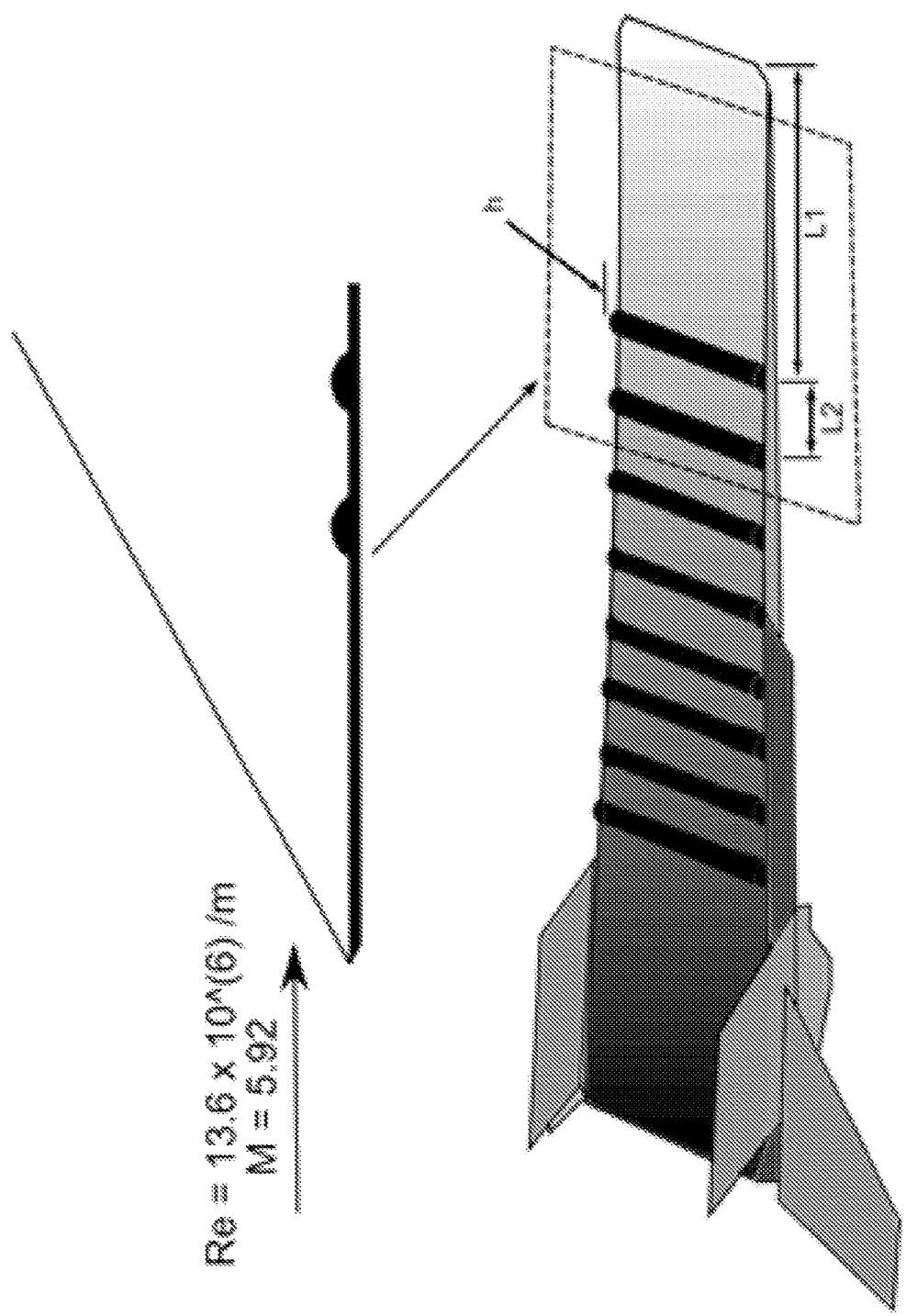
FIG. 9 illustrates schematically an exemplary hypersonic vehicle with surface roughness elements in accordance with the present invention configured to delay transition.

FIG. 9 illustrates schematically an exemplary hypersonic vehicle with surface roughness elements in accordance with the present invention configured to delay transition. For example, at a cruising speed of Mach 5.92 with unit Reynold's number about 13 million where the most unstable frequency is assumed to be at 133 kHz, the first roughness is mounted at the synchronization point of 133 kHz perturbation which is found to be at 0.185 m from the leading edge of the flat plate. The height of the first roughness element is 50% of the local boundary layer thickness, 0.805 mm, measured with the mean-flow without roughness. This information is obtained from numerical simulation and it is about 1.61 mm in this case. Meanwhile, the first roughness width is fixed at twice the local boundary-layer thickness at 3.22 mm. In order to maintain laminar flow on the vehicle for a considerable range, a row of roughness elements is applied downstream of the synchronization point. The second roughness element is located at about 10 roughness width, 32.2 mm, downstream of the first roughness. Again, the second roughness width, and height are dependent of the local boundary-layer thickness at its location, and their specific values increase accordingly. The location and geometry of the third, fourth roughness elements can then be calculated and applied in the same manner. Since the vehicle mainly has a flat-plate shape, our simulation is carried out near the leading edge region of the vehicle including two stripes.

Various materials may be employed as surface roughness elements in accordance with embodiments of the invention. Due to the relatively small size of the roughness elements, i.e. typically about 40%-60% the height of the local boundary-layer thickness, the roughness elements may be manufactured as part of surface with variation in the surface configuration, e.g. by properly molding or forming composites as known by those skilled in the art. Accordingly, the same materials that are conventionally employed for the outer surface of aircraft and spacecraft, such as Aluminum. Aluminum-Lithium alloys, graphite-fiber composites, polymer-matrix composites, metal-matrix composites, and Carbon-Carbon Composites, may also be used for the roughness, elements in embodiments of the invention depending on the speed and operating range of the applicable vehicle.

It should also be noted that the cross-sectional shape of the roughness elements are not believed to be critical. However, the cross-sectional shape are typically half-elliptic, but may also be half-cylindrical, half-spherical, or any other shape suitable for enduring supersonic flow. The principle shape requirement of the roughness element is that it will not cause severe flow separations around the element. This requirement generally drives a limitation of the height of the roughness element. In addition, when three-dimensional roughness elements, e.g. bumps, are employed, it should be noted that the distance between adjacent bumps (perpendicular to the flow) is small enough so that the effects of the bump distance are not critical. In other words, the bumps are disposed close enough to one another to be considered functionally equivalent to a three-dimensional stripe over a surface, e.g. the conical form vehicle.

3. Exemplary Analysis for Controlling Supersonic Laminar Flow

A control strategy based on general $e^N$ analysis can be employed using a novel high-order cut-cell method for the direct numerical simulation of hypersonic boundary-layer flows with arbitrary surface roughness. The new method can be applied to the example stabilization of a Mach 5.92 flow over a flat plate by two-dimensional limited height roughness elements. The results show that mode S is stabilized when the roughness element is downstream of the synchronization point. The stability characteristics of the Mach 5.92 flat-plate boundary layer are studied by the linear stability theory.

Figure 10:
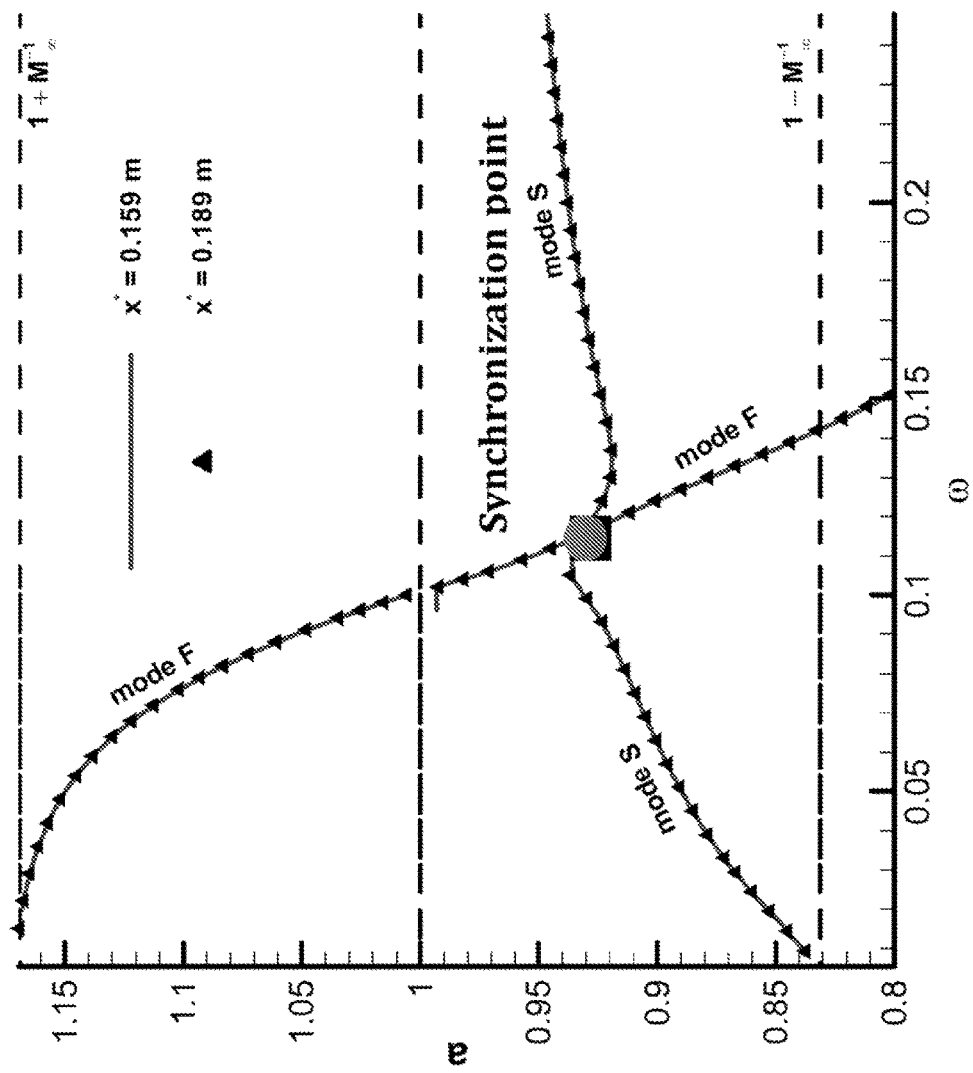
FIG. 10 shows an example plot of the dimensionless phase velocities of mode S and mode F of boundary-layer waves at two locations of x=0.159 m and x=0.189 m as a function of the dimensionless circular frequency.

FIG. 10 shows an example plot of the dimensionless phase velocities of boundary-layer waves at two locations of x=0.159 m and x=0.189 m as a function of the dimensionless circular frequency. In this plot, the three horizontal dashed lines represent the dimensionless phase velocities of fast acoustic waves ($a=1+M_\infty^{-1}$), entropy and vorticity waves ($a=1$), and slow acoustic waves ($a=1-M_\infty^{-1}$), respectively. The figure shows that mode S synchronizes with mode F at the point where $\omega_s=0.11563$ and $a_s=0.93076$. At the synchronization point, dimensionless phase velocities of mode S and mode F are identical. The location of the synchronization point in the x coordinate for a given dimensionless frequency can be calculated using the following formula, $$x_s = \frac{(\omega_s/F)^2}{R} \quad (1)$$

where the dimensionless frequency F and the local Reynolds number R are defined as, $$F = \frac{2\pi f \mu_\infty}{\rho_\infty u_\infty^2} \quad (2)$$

$$R = \sqrt{Re_x} = \sqrt{Re_\infty x} \quad (3)$$

From Eqns. (2) and (3), the dimensionless circular frequency can be rewritten as, $$\omega = RF \quad (4)$$

Figure 11:
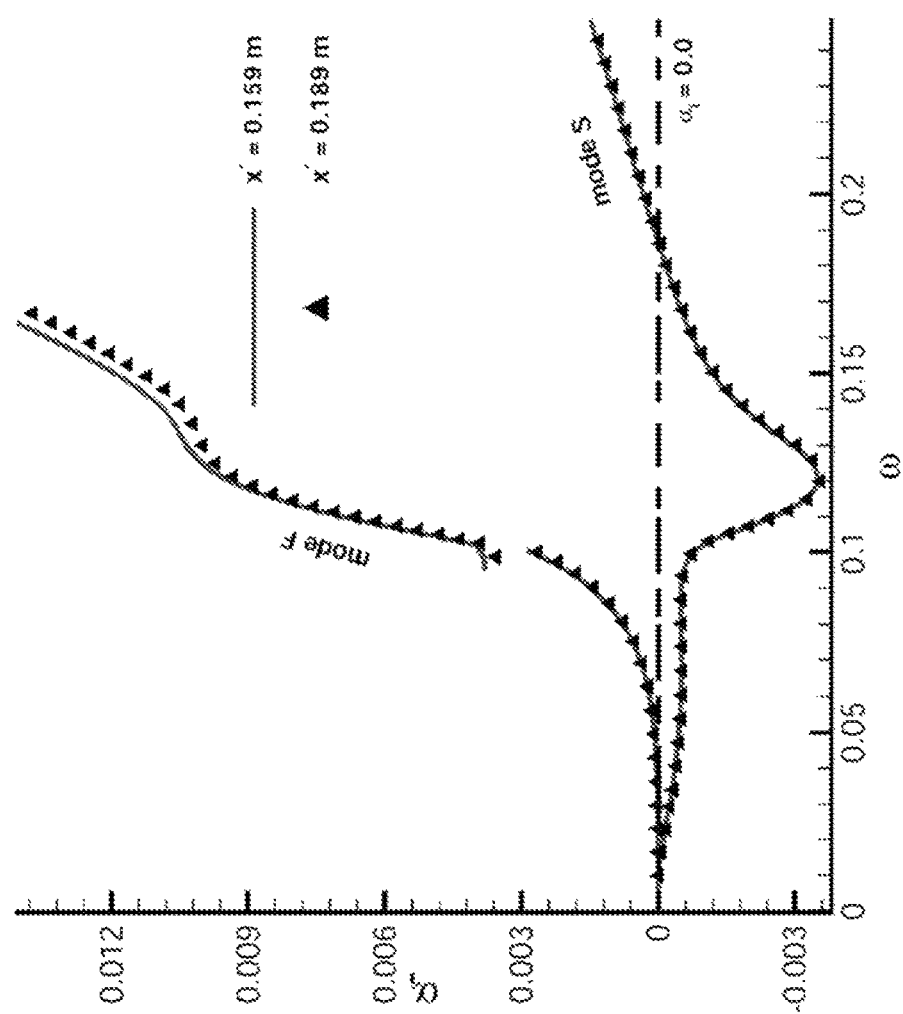
FIG. 11 shows growth rates of mode S and mode F at two different locations versus dimensionless circular frequency.

FIG. 11 shows the growth rates of mode S and mode F at the same set of locations as a function of the dimensionless circular frequency. The horizontal dashed line stands for the neutral waves ($\alpha_i=0$). Mode S is unstable in the region from ($\omega_I=0.01827$) to ($\omega_{II}=0.18465$), where the parameters, $\omega_I$ and $\omega_{II}$, are called the Branch I and Branch II neutral points of mode S. The locations of the Branch I and Branch II neutral points in the x coordinate can be calculated from $$x_I = \frac{(\omega_I/F)^2}{R} \quad (5)$$

$$x_{II} = \frac{(\omega_{II}/F)^2}{R} \quad (6)$$

The N factor of the unstable mode S are then calculated by integrating the growth rate from the Branch I neutral point to the Branch II neutral point.

$$N = -\int_{x_I}^{x_{II}} \alpha_i(x)dx \quad (7)$$

For a hypersonic flow where the transition is dominated by the second mode, it is possible to calculate the N factor by the linear stability theory.

Figure 12:
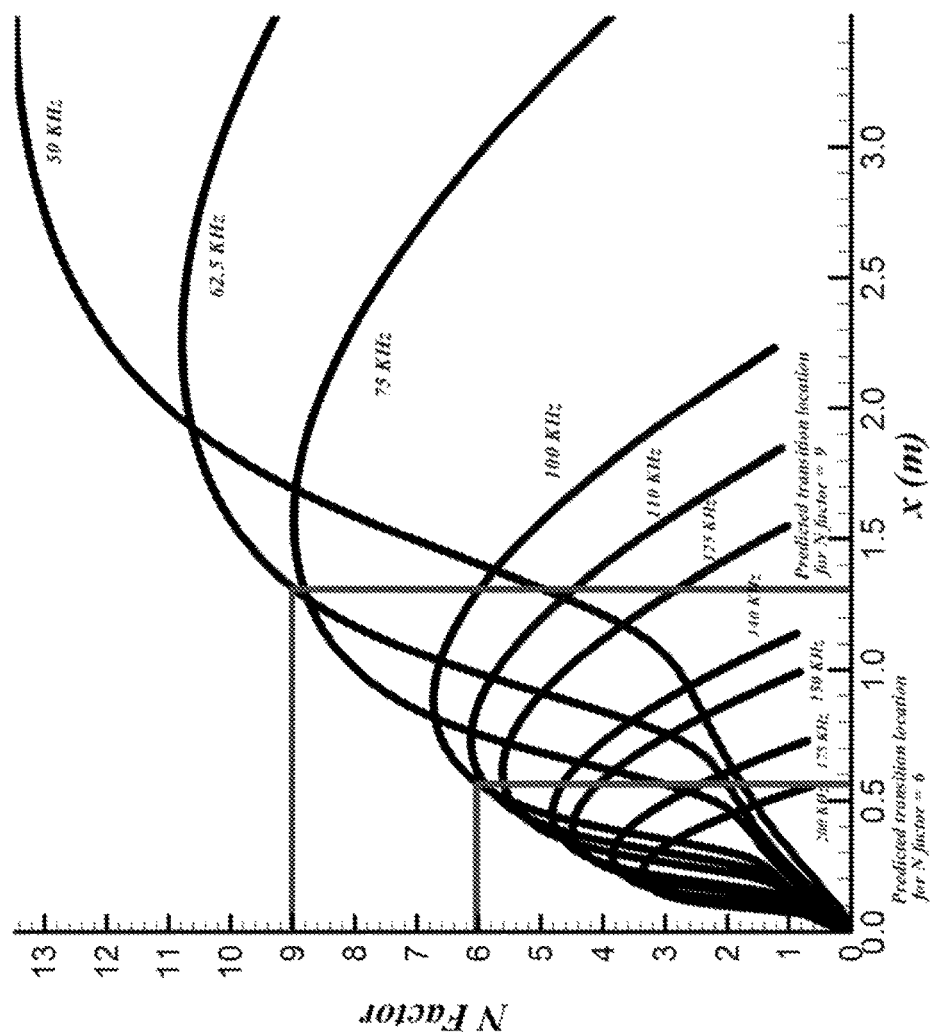
FIG. 12 shows N factors of the Mach 5.92 boundary layer for mode S at different frequencies.

FIG. 12 shows the N factor of the Mach 5.92 flat-plate boundary layer for mode S at different frequencies. It should be noted that the N-factor increases rapidly as the frequency decreases. Although the N factor strongly depends on vehicle geometry and flow condition, there is generally an expected N factor for a specific design of hypersonic vehicle. For example, the typical N factor of the second mode related transition of hypersonic flat-plate boundary layers is 5-6 in traditional wind tunnel experiments and 8-9 in quite tunnel experiments or real flight tests. Based on the design N factor and the growth rate calculated by the linear stability theory, one can determine the frequency of the dominant second mode instability and the corresponding synchronization point. Surface roughness is then put downstream of the synchronization point to maintain laminar flow by delaying transition. It will not trip the boundary-layer transition as long as the roughness height is between 40% and 60% of the local boundary-layer thickness.

An example method applying the of the novel control technique was described above in FIG. 6. To illustrate, this method may now be applied the example Mach 5.92 flat-plate boundary layer. If the design N factor is 9, FIG. 12 shows that the frequency of the dominant second mode is 62.5 kHz. At this frequency, the corresponding synchronization point is at $x_s=0.84951$ m calculated by Eq. (1). However, if the design N factor is 6, the frequency of the dominant second mode is 100 kHz. At this frequency, the corresponding synchronization point is located at $x_s=0.33184$ m.

Figure 13:
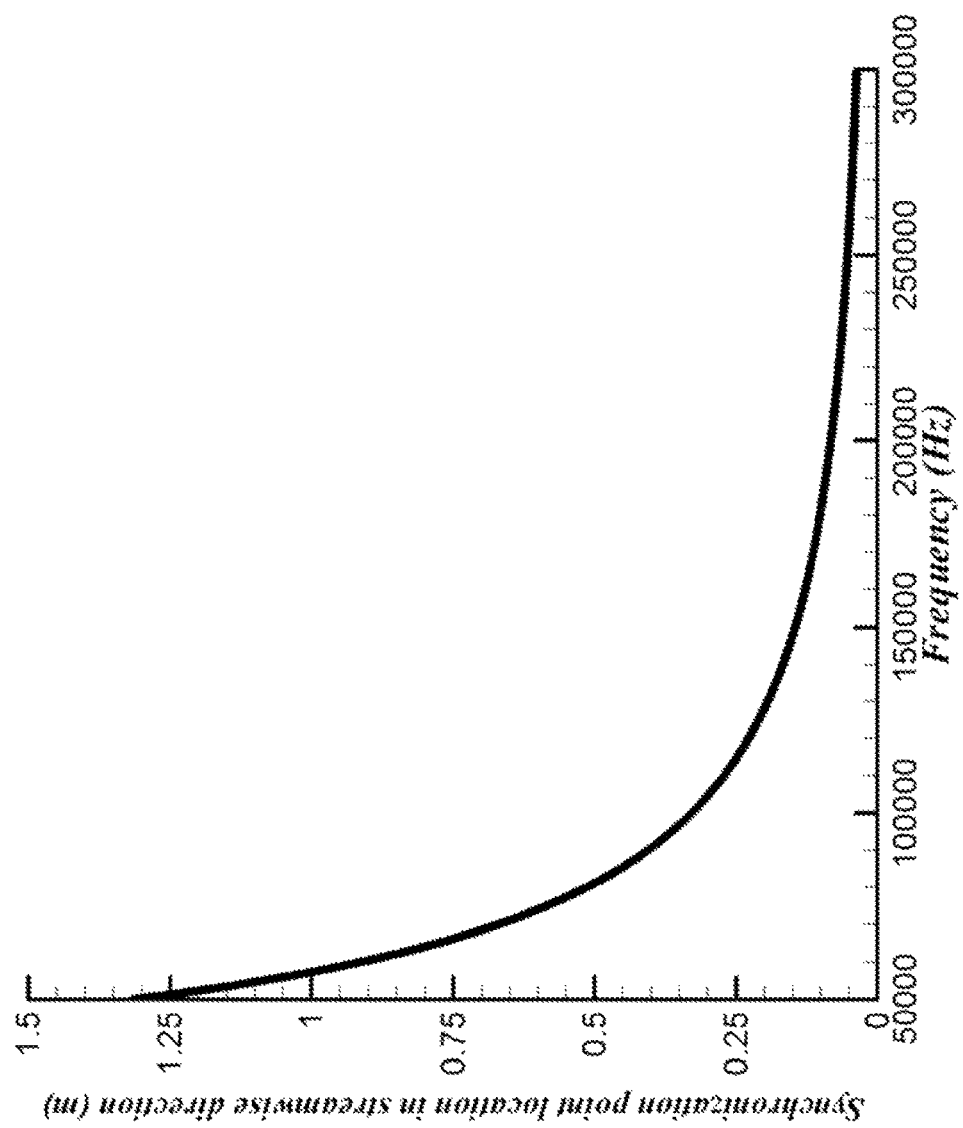
FIG. 13 shows the location of the synchronization point with respect to the frequency.

FIG. 13 shows the location of the synchronization point with respect to the frequency in the example. It should be noted that the synchronization point moves downstream rapidly as the frequency increases. To demonstrate the new control strategy, series of numerical simulations may be carried out for the Mach 5.92 flat-plate boundary layer. At first, a perturbation with a wide range of frequency is imposed on the mean flow. A two-dimensional slot is modeled on the flat plate located at x=0.1 m with a width of 0.003 m. The slot introduces wall normal velocity to the mean flow. The perturbation is Gaussian in time and sinusoidal in space so that no additional mass is introduced into the mean flow. The pulse has a frequency range around 1 M Hz, which is broad enough to cover the most unstable modes in the flow. This pulse model is implemented into a case in which the roughness locates at x=0.185 m.

Figure 14:
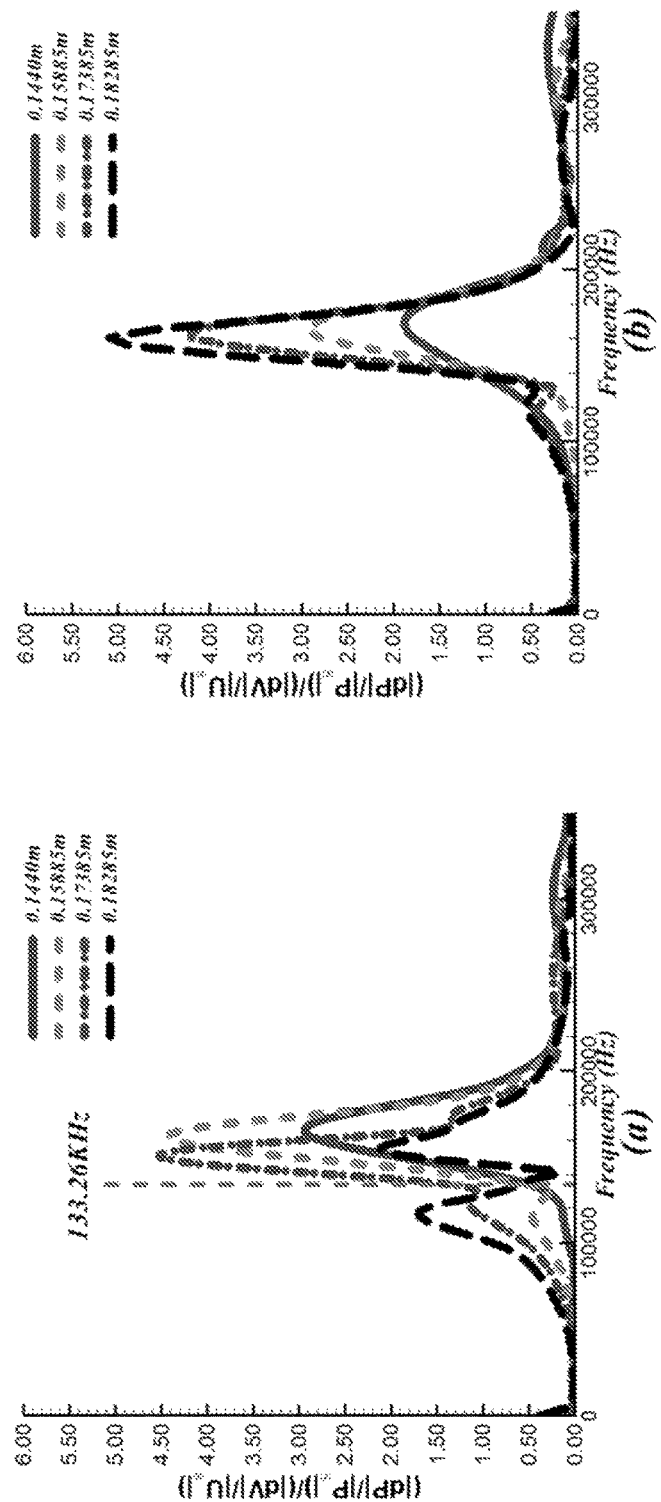
FIG. 14 shows non-dimensional spectra of wall pressure perturbation at different locations: (a) with roughness (b) no roughness.

FIG. 14 shows the frequency spectra of wall pressure perturbation at different locations upstream of the roughness. The results with roughness and without roughness are both included. The location of roughness in this case, 0.185 m, corresponds to the location of the synchronization point at the frequency 133.26 kHz which is highlighted in FIG. 14(a). Here, the frequency 133.26 kHz is defined as the synchronization frequency. It should be noted that perturbations at the range of frequency from 0 Hz to 120 kHz are amplified compared with the no roughness case. Moreover, at x=0.17385 m, the peak observed in FIG. 14(b) around f=165 kHz for the no roughness case has moved to a lower frequency around f=145 kHz for the case with roughness. This shift can be explained by the increase of the local boundary-layer thickness due to the existence of roughness. Since the wavelength of the second mode is related to the boundary layer thickness, a thicker boundary layer produces a longer second mode wavelength and thus the frequency becomes lower. At x=0.18285 m, the perturbation at the frequency around f=133.26 kHz (116 KHz to 155 KHz) is strongly damped. The lowest perturbation amplitude of the FFT result is at f=140 kHz.

Figure 15:
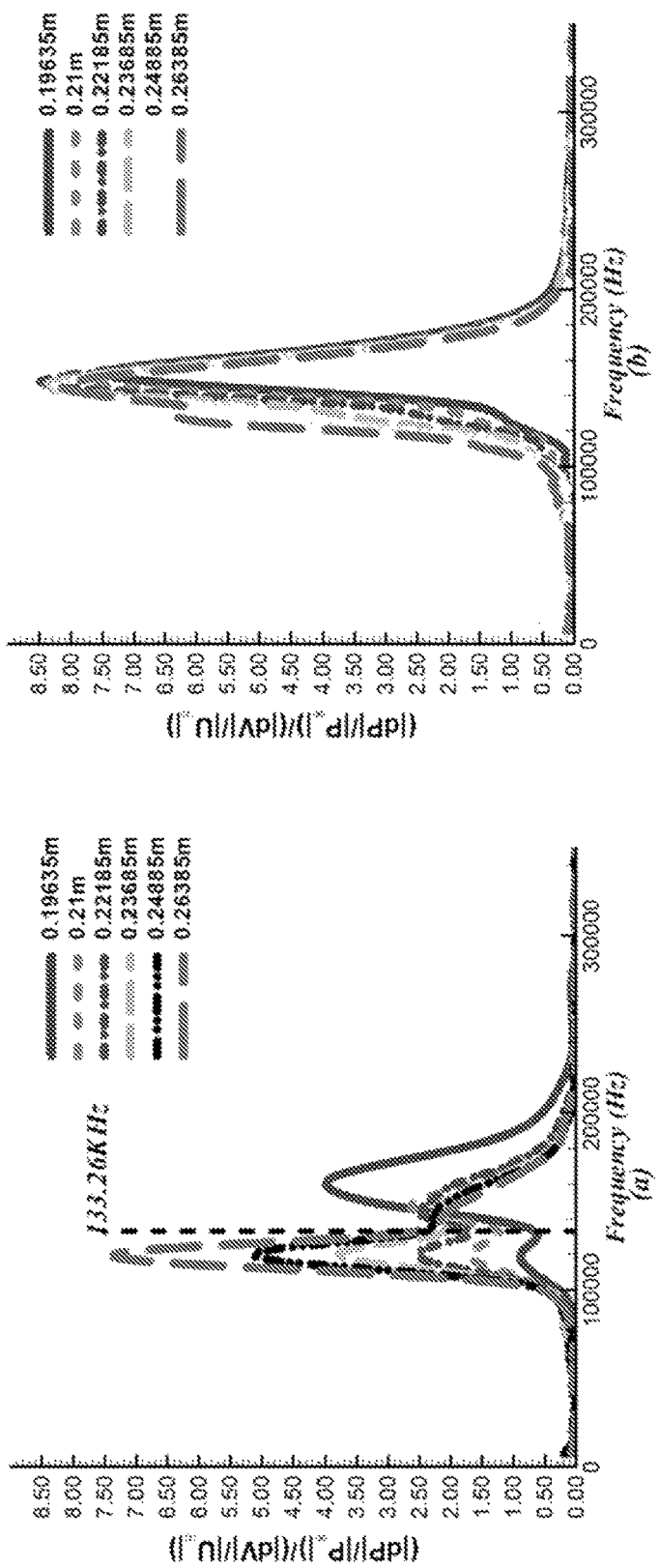
FIG. 15 shows non-dimensional spectra of wall pressure perturbation at different locations: (a) with roughness (b) no roughness.

FIG. 15 shows the frequency spectra of wall pressure perturbation at different locations further downstream (FIG. 15(a)) and the FFT results of the same locations without roughness (FIG. 15(b)). At x=0.19635 m, a location just behind the roughness, perturbation at frequency between 100 kHz and 120 kHz is amplified compared with no roughness case. However, frequencies around 133.26 kHz are all highly damped. The frequency range of this damping effect is from around 120 kHz to 170 kHz. The strongest damping occurs very close to the synchronization frequency. As the perturbation travels downstream, the higher frequency perturbation (around 140 kHz to 170 kHz) that has been damped in the previous location drops even further. Meanwhile, perturbation at frequency around 133.26 kHz starts to grow at a slow rate. For the amplified perturbation at frequency around 120 kHz, the growth is very strong, and the perturbation amplitude is always greater than of no roughness case. The FFT results from upstream and downstream of roughness show that a two-dimensional roughness is capable of amplifying perturbation at frequency lower than the synchronization frequency, while it damps perturbation at frequency close to and higher than the synchronization frequency.

Figure 16:
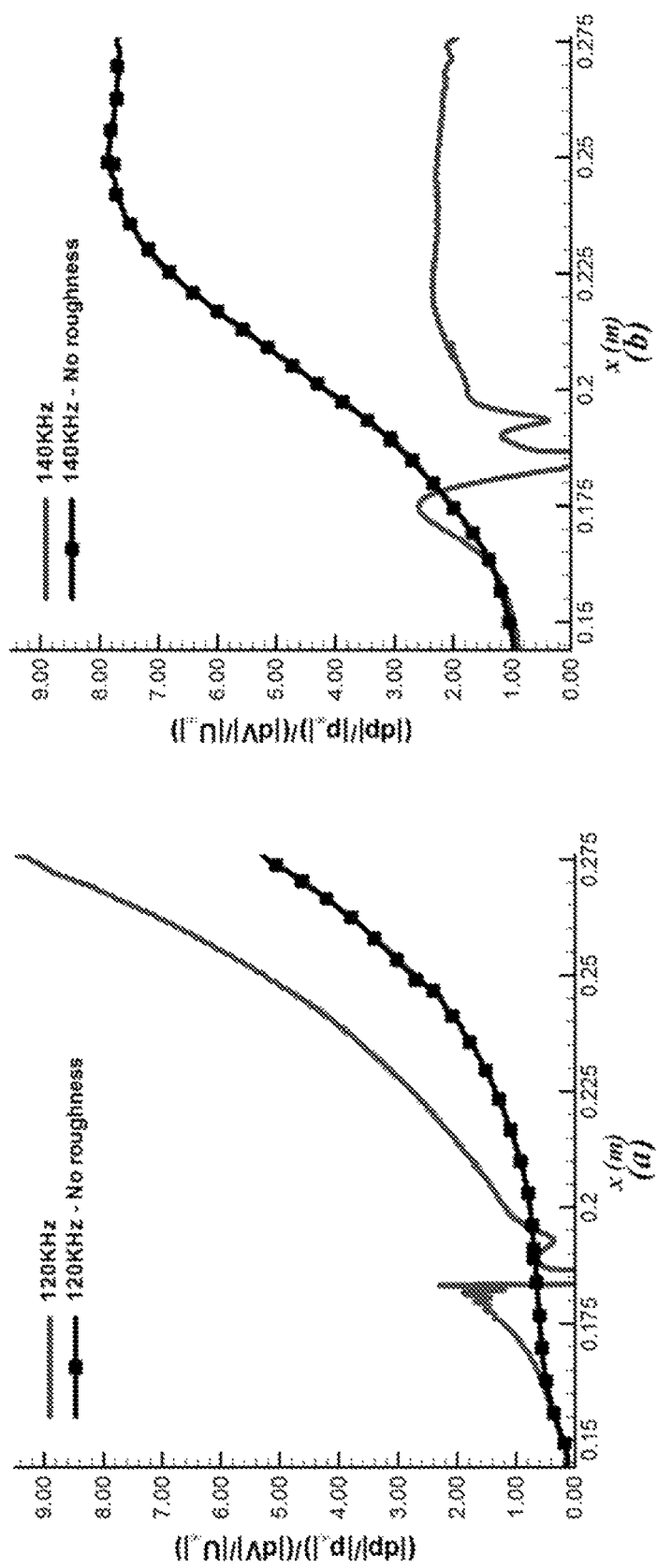
FIG. 16 illustrates spatial evolution of wall pressure perturbation at two different frequencies: (a) 120 KHz (b) 140 KHz.

FIG. 16 shows the normalized amplitude of wall pressure perturbation at two different frequencies, the frequencies higher than and lower than the synchronization frequency 133.26 kHz. For comparison, their evolution of the case without roughness is also included. The figure shows that perturbation at 120 kHz is highly amplified due to the roughness. At the right end of the figure, its amplitude is almost twice than the case without roughness. For perturbation at 140 kHz, the damping effect is pronounced. As shown in FIG. 16(b), the normalized amplitude grows to around 8 without roughness. On the other hand, with the existence of roughness, the amplitude level stays at around 2 at the right end of the figure. The results show that the perturbation is damped as roughness is placed close to or downstream of synchronization point. In the pulse case, roughness location is fixed. Therefore, the location of roughness is the synchronization point of one particular frequency (133.26 kHz). In the view of perturbation at a frequency below 133.26 kHz, the roughness location is the same as upstream of its synchronization point. As a result, the amplified perturbation at around 120 kHz is consistent with the previous conclusion. On the other hand, in the view of perturbation at a frequency higher than 133.26 kHz, the roughness location is located downstream of its synchronization points. The damping effect observed for 140 kHz supports the previous conclusion as well. This agreement solidifies our findings.

Other than one single roughness, a two roughness model is also considered. The first roughness is at the same location as in the previous case, x=0.185 m. The height of the first roughness is fixed at 50% of the local boundary-layer thickness. The second roughness is put in the downstream region of the first roughness at xr=-0.231 m, while its height is kept the same as the first roughness. The location of the first roughness corresponds to the synchronization point of frequency 133.26 kHz, while the location of the second roughness corresponds to the synchronization point of frequency 119.26 kHz.

Figure 17:
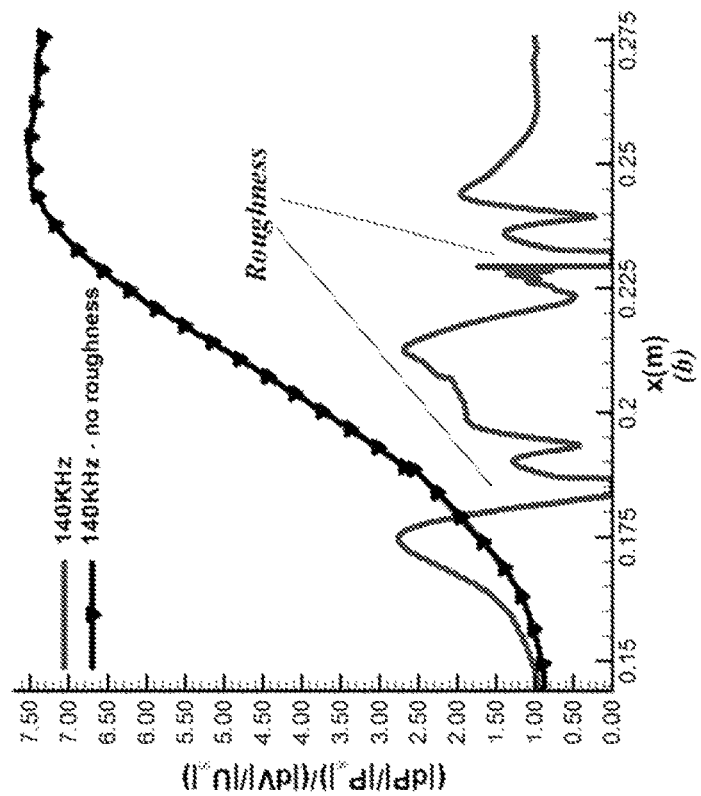
FIG. 17 illustrates spatial evolution of wall pressure perturbation for the two roughness element case at two different frequencies: (a) 120 KHz (b) 140 KHz.
Figure 17:
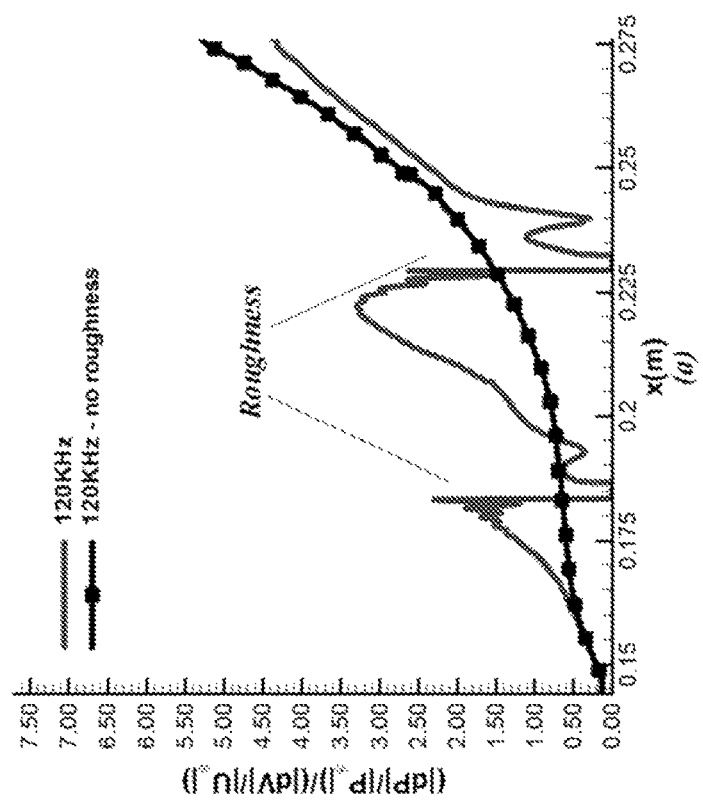

FIG. 17 shows the spatial development of perturbation at different frequency. Similar to FIG. 16, the two frequencies are 120 kHz and 140 kHz. Since the location of the second roughness corresponds to the synchronization point of frequency 119.26 kHz, it is expected the perturbation at 120 kHz will be damped after the second roughness. FIG. 17 confirms the expectation. It is shown that the first roughness amplifies 120 kHz perturbation since it is upstream of its synchronization point. However, when the perturbation travels downstream and approaches the second roughness, it starts to be damped since the roughness locates very close to its synchronization point. Downstream of the second roughness, the perturbation at 120 kHz is weaker than the case without roughness. On the other hand, both roughness are located downstream of their synchronization point for perturbation at frequency 140 kHz. Therefore, the two roughness elements have damping effect at this frequency. FIG. 17(b) shows that the damping effect is more pronounced in two roughness case than in one roughness.

In order to evaluate the effect of both roughness element locations and roughness element heights on a hypersonic flat plate, the roughness elements at two different locations are considered. In each location, four different roughness heights ranging from 25% to 62.5% of the local boundary layer thickness are considered. The locations of roughness are chosen according to the synchronization point of 100 kHz. For unsteady simulations, pure mode S at 100 kHz may be imposed to the mean flow near the leading edge. The details of each example case are listed below. In case 1 the parameters are: roughness at upstream of the synchronization point, xr=0.185 m, local boundary layer thickness $\delta=1.61 \times 10^3$ m, roughness height 0.25$\delta$, 0.375$\delta$, 0.5$\delta$, 0.625$\delta$. In case 2 the parameters are: roughness at downstream of the synchronization point, xr=0.410 m, local boundary layer thickness $\delta=3.42 \times 10^3$ m, roughness height 0.25$\delta$, 0.375$\delta$, 0.5$\delta$, 0.625$\delta$.

Figure 18:
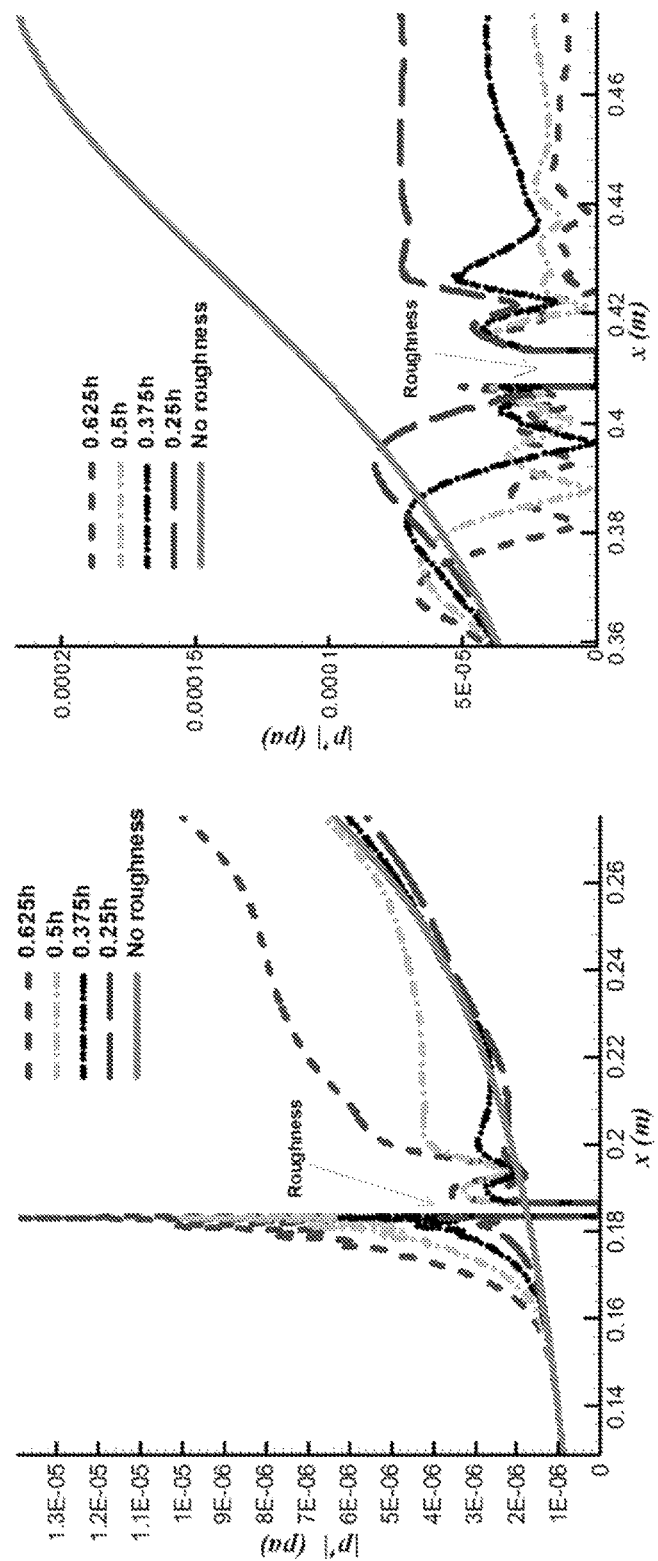
FIG. 18 illustrates the evolution of mode S with different roughness height: (a) case 1 roughness at 0.185 m (b) case 2 roughness at 0.410 m.

FIG. 18 shows the growth of mode S along the wall for case 1 and case 2. The data for each roughness element height is included on each plot. Here, the symbol h represents the local boundary layer thickness. The roughness of case 1 is located upstream of the synchronization point at x=0.185 m. The amplification rate depends strongly on the size of roughness. For example, with roughness height 0.25 h of case 1, the maximum amplitude is just about 3 times of the case without roughness. On the other hand, in the roughness case having the greatest height, the jump in perturbation amplitude reaches as high as 13 times of that without any roughness element.

FIG. 18(a) (case 1) shows the roughness height controls how perturbation grows downstream of roughness. Downstream of roughness, evolution of perturbation exhibits a different trend depending on the roughness location. It is found that perturbation is amplified for taller roughness (e.g. 0.625 h and 0.5 h). For smaller roughness, perturbation remains comparable to the no roughness case. In general, roughness elements at this location have more pronounced amplification effect in the vicinity upstream of roughness than downstream.

FIG. 18(b) (case 2) shows how pressure perturbation interacts with different roughness height at this location. The roughness is moved further downstream to x=0.41 m, which is behind the synchronization point of the imposed frequency. Perturbation is amplified far upstream of roughness, but flow is all damped when it gets close to the vicinity of roughness. For all roughness heights, damping effect is observed. In the region behind roughness, perturbation for all cases stays on the same level and does not grow at all. Accordingly, roughness in this location acts as an effective perturbation damper of the imposed mode S, which can stabilize the flow.

In view of the foregoing, surface roughness has been found to have a damping effect on the second mode instabilities. Specifically, the location of roughness elements with respect to the synchronization point of perturbation is critical. If roughness elements are located upstream of the synchronization point, the amplitude of perturbation will be amplified by roughness. On the other hand, if roughness elements are located at the synchronization point or downstream of it, the perturbation is damped. Embodiments of the present invention delay the second mode related transition based on this novel principle. The stabilization efficiency of surface roughness elements depends on flow conditions of the boundary layer (Mach number, Reynolds number, etc.), geometric parameters of roughness element (height, width, etc.), and the placement of roughness elements (location, space between neighboring elements, etc.).

Roughness element height has a significant effect on the damping of perturbation. The strength of damping in the example cases show the tallest roughness case can be 400% stronger than the shortest roughness case. However, roughness element height should still be lower than the local boundary layer thickness in order avoid introducing any other instabilities into the flow. On the other hand, comparison between a one roughness element case with two roughness element case shows that the second roughness element, which is located about 10 roughness widths downstream of the first roughness element, can further damp the disturbance to about 50% of the one roughness element case. It is expected that more roughness elements can keep the perturbation strength stabilized.

Another parameter which might be considered is the roughness width (in the direction of flow). However, no significant variation may be observed with the width being 0.5, 1 and 4 times the boundary-layer thickness compared to a primary example case with the roughness width being twice the boundary-layer thickness.

Based on the foregoing detailed description, those skilled in the art with appreciate that embodiments of the invention may employ standardized surface roughness elements to be applied to the hypersonic vehicle surfaces in specific locations and patterns in order to aid stabilization of laminar flow. For a specific design of hypersonic vehicle, there is a most unstable mode frequency. The exact location, height, and spacing of surface roughness elements may be determined by a numerical simulation strategy based on the most unstable second mode. The frequency of the most unstable second mode can be determined with the help of the widely used $e^N$ transition prediction method, experimental measurement, or some other means. For example, the frequency of the dominant second mode instability and the corresponding synchronization point may be analytically calculated using the linear stability theory. Surface roughness is then disposed downstream of the synchronization point to maintain laminar flow and delay transition. Numerical simulations can be used to show that surface roughness will not trip the boundary-layer transition if the roughness height is between 40% and 60% of the local boundary-layer thickness. Multiple surface roughness elements can also be attached to the vehicles surfaces at different location to enhance laminar flow stabilization.

As detailed above, surface roughness can stabilize hypersonic boundary layers when it is located downstream of the synchronization point of mode S and mode F. Together with the linear stability theory, the synchronization point of a hypersonic boundary layer can be predicted and surface roughness element locations determined to achieve efficient stabilization. The surface roughness elements typically have a height between 40% and 60% of the local boundary-layer thickness so that they do not trip the boundary layer. The exact location, height, and spacing of surface roughness elements may be determined by a numerical simulation based on the most unstable second mode. Those skilled in the art will appreciate that embodiments of the invention employing the described procedures and analysis may be automated in the form a computer software package to design the parameters of surface roughness elements and calculate the location of surface roughness elements for an input supersonic vehicle surface.

This concludes the description including the preferred embodiments of the present invention. The foregoing description including the preferred embodiment of the invention has been presented for the purposes of illustration and description. It is not intended to be exhaustive or to limit the invention to the precise forms disclosed. Many modifications and variations are possible within the scope of the foregoing teachings. Additional variations of the present invention may be devised without departing from the inventive concept as set forth in the following claims.

What is claimed is:

1. A supersonic vehicle, comprising:
   an exterior surface section having a leading edge for receiving compressible fluid flow over the exterior surface; and
   one or more surface roughness elements disposed on the exterior surface section to damp disturbances of the flow over the exterior surface;
   wherein the one or more surface elements are disposed on the exterior surface no closer to the leading edge than a synchronization point of mode S and mode F of the flow over the exterior surface section.

2. A method of damping disturbances of flow over a supersonic vehicle, comprising:
   determine for an exterior surface section having a leading edge a most unstable frequency of compressible fluid flow over the exterior surface;
   determine a synchronization point of mode S and mode F of the flow over the exterior surface section from the leading edge; and
   dispose one or more surface roughness elements on the exterior surface section no closer to the leading edge than the synchronization point of mode S and mode F.

3. The supersonic vehicle of claim 1, wherein the one or more surface elements are disposed on the exterior surface upstream of laminar-turbulent transition of the flow over the exterior surface section from the leading edge.

4. The supersonic vehicle of claim 3, wherein the one or more surface roughness elements comprises a height from the exterior surface section of between 40% and 60% of a local boundary-layer thickness of the flow over the exterior surface section.

5. The supersonic vehicle of claim 1, wherein the one or more surface roughness elements are spaced along the exterior surface section in a direction of the flow between ten and twenty times a height from the exterior surface of the one or more surface roughness elements.

6. The supersonic vehicle of claim 1, wherein the one or more surface roughness elements comprise two-dimensional elements each formed by a cross-sectional area swept along a line substantially perpendicular to a direction of the flow along the exterior surface section.

7. The supersonic vehicle of claim 6, wherein the exterior surface section comprises a two dimensionally bounded area and the two-dimensional elements comprise stripes having ends at edges of the two dimensionally bounded area.

8. The supersonic vehicle of claim 6, wherein the exterior surface section comprises a three dimensional surface and the two-dimensional elements comprise rings such that each cross sectional area is swept along the line that closes on itself.

9. The supersonic vehicle of claim 1, wherein the one or more surface roughness elements comprise three-dimensional elements each formed by surface bumps spaced along a line substantially perpendicular to a direction of the flow along the exterior surface section.

10. The supersonic vehicle of claim 9, wherein the exterior surface section comprises a two dimensionally bounded area and each line of surface bumps ends at edges of the two dimensionally bounded area.

11. The supersonic vehicle of claim 9, wherein the exterior surface section comprises a three dimensional surface and each line of surface bumps are disposed along the line that closes on itself.

12. The method of claim 2, wherein the one or more surface elements are disposed on the exterior surface upstream of laminar-turbulent transition of the flow over the exterior surface section from the leading edge.

13. The method of claim 12, wherein the one or more surface roughness elements comprises a height from the exterior surface section of between 40% and 60% of a local boundary-layer thickness of the flow over the exterior surface section.

14. The method of claim 2, wherein the one or more surface roughness elements are spaced along the exterior surface section in a direction of the flow between ten and twenty times a height from the exterior surface of the one or more surface roughness elements.

15. The method of claim 2, wherein the one or more surface roughness elements comprise two-dimensional elements each formed by a cross-sectional area swept along a line substantially perpendicular to a direction of the flow along the exterior surface section.

16. The method of claim 15, wherein the exterior surface section comprises a two dimensionally bounded area and the two-dimensional elements comprise stripes having ends at edges of the two dimensionally bounded area.

17. The method of claim 15, wherein the exterior surface section comprises a three dimensional surface and the two-dimensional elements comprise rings such that each cross sectional area is swept along the line that closes on itself.

18. The method of claim 2, wherein the one or more surface roughness elements comprise three-dimensional elements each formed by surface bumps spaced along a line substantially perpendicular to a direction of the flow along the exterior surface section.

19. The method of claim 18, wherein the exterior surface section comprises a two dimensionally bounded area and each line of surface bumps ends at edges of the two dimensionally bounded area.

20. The method of claim 18, wherein the exterior surface section comprises a three dimensional surface and each line of surface bumps are disposed along the line that closes on itself.

* * * * *